(12) United States Patent
Hagood, IV et al.

(10) Patent No.: US 7,619,806 B2
(45) Date of Patent: Nov. 17, 2009

(54) METHODS AND APPARATUS FOR SPATIAL LIGHT MODULATION

(75) Inventors: Nesbitt W. Hagood, IV, Wellesley, MA (US); Richard S. Payne, Andover, MA (US); Jasper Lodewyk Steyn, Winchester, MA (US)

(73) Assignee: Pixtronix, Inc., Andover, MA (US)

( * ) Notice: Subject to any disclaimer, the term of this patent is extended or adjusted under 35 U.S.C. 154(b) by 0 days.

(21) Appl. No.: 11/594,042

(22) Filed: Nov. 6, 2006

(65) Prior Publication Data

US 2007/0091038 A1   Apr. 26, 2007

Related U.S. Application Data

(63) Continuation of application No. 11/218,690, filed on Sep. 2, 2005, now Pat. No. 7,417,782.

(60) Provisional application No. 60/676,053, filed on Apr. 29, 2005, provisional application No. 60/655,827, filed on Feb. 23, 2005.

(51) Int. Cl.
*G02B 26/00* (2006.01)
*G02B 26/02* (2006.01)

(52) U.S. Cl. ..................... 359/290; 359/233

(58) Field of Classification Search ............ 359/197, 359/198, 223, 224, 230, 233, 290, 291
See application file for complete search history.

(56) References Cited

U.S. PATENT DOCUMENTS

| | | |
|---|---|---|
| 4,067,043 A | 1/1978 | Perry |
| 4,564,836 A | 1/1986 | Vuilleumier et al. |
| 4,582,396 A | 4/1986 | Bos et al. |
| 4,673,253 A | 6/1987 | Tanabe et al. |
| 4,744,640 A | 5/1988 | Phillips |
| 4,958,911 A | 9/1990 | Beiswenger et al. |
| 4,991,941 A | 2/1991 | Kalmanash |
| 5,005,108 A | 4/1991 | Pristash et al. |
| 5,042,900 A | 8/1991 | Parker |
| 5,050,946 A | 9/1991 | Hathaway et al. |
| 5,062,689 A | 11/1991 | Koehler |
| 5,093,652 A | 3/1992 | Bull et al. |
| 5,096,279 A | 3/1992 | Hornbeck et al. |
| 5,136,480 A | 8/1992 | Pristash et al. |
| 5,142,405 A | 8/1992 | Hornbeck |

(Continued)

FOREIGN PATENT DOCUMENTS

EP    0 359 450 A2    9/1989

(Continued)

OTHER PUBLICATIONS

Joaquim, M., "Polyphenyl Ether Lubricants" Synthetic Lubricants and High-performance Functional Fluids, R. L. Rudnick and R. L. Shubkin, Eds., p. 239, Marcel Dekker, Inc., NY, 1999.

(Continued)

*Primary Examiner*—William C Choi
(74) *Attorney, Agent, or Firm*—Ropes & Gray LLP

(57) ABSTRACT

Improved apparatus and methods for spatial light modulation are disclosed which utilize optical cavities having both front and rear reflective surfaces. Light-transmissive regions are formed in the front reflective surface for spatially modulating light.

40 Claims, 20 Drawing Sheets

U.S. PATENT DOCUMENTS

| | | |
|---|---|---|
| 5,198,730 A | 3/1993 | Vancil |
| 5,202,950 A | 4/1993 | Arego et al. |
| 5,233,459 A | 8/1993 | Bozler et al. |
| 5,280,277 A | 1/1994 | Hornbeck |
| 5,319,491 A | 6/1994 | Selbrede |
| 5,339,179 A | 8/1994 | Rudisill et al. |
| 5,379,135 A | 1/1995 | Nakagaki et al. |
| 5,396,350 A | 3/1995 | Beeson et al. |
| 5,440,197 A | 8/1995 | Gleckman |
| 5,465,175 A | 11/1995 | Woodgate et al. |
| 5,467,104 A | 11/1995 | Furness, III et al. |
| 5,479,279 A | 12/1995 | Barbier et al. |
| 5,493,439 A | 2/1996 | Engle |
| 5,519,565 A | 5/1996 | Kalt et al. |
| 5,528,262 A | 6/1996 | McDowall et al. |
| 5,559,389 A | 9/1996 | Spindt et al. |
| 5,568,964 A | 10/1996 | Parker et al. |
| 5,578,185 A | 11/1996 | Bergeropn et al. |
| 5,579,035 A | 11/1996 | Beiswenger |
| 5,596,339 A | 1/1997 | Furness, III et al. |
| 5,613,751 A | 3/1997 | Parker et al. |
| 5,618,096 A | 4/1997 | Parker et al. |
| 5,619,266 A | 4/1997 | Tomita et al. |
| 5,655,832 A | 8/1997 | Pelka et al. |
| 5,659,327 A | 8/1997 | Furness, III et al. |
| 5,666,226 A | 9/1997 | Ezra et al. |
| 5,684,354 A | 11/1997 | Gleckman |
| 5,731,802 A | 3/1998 | Aras et al. |
| 5,745,281 A * | 4/1998 | Yi et al. ................ 359/290 |
| 5,771,321 A | 6/1998 | Stern |
| 5,784,189 A | 7/1998 | Bozler et al. |
| 5,794,761 A | 8/1998 | Renaud et al. |
| 5,801,792 A | 9/1998 | Smith et al. |
| 5,835,255 A | 11/1998 | Miles |
| 5,835,256 A | 11/1998 | Huibers |
| 5,854,872 A | 12/1998 | Tai |
| 5,876,107 A | 3/1999 | Parker et al. |
| 5,884,872 A | 3/1999 | Greenhalgh |
| 5,889,625 A | 3/1999 | Chen et al. |
| 5,894,686 A | 4/1999 | Parker et al. |
| 5,895,115 A | 4/1999 | Parker et al. |
| 5,921,652 A | 7/1999 | Parker et al. |
| 5,936,596 A | 8/1999 | Yoshida et al. |
| 5,953,469 A | 9/1999 | Zhou |
| 5,975,711 A | 11/1999 | Parker et al. |
| 5,986,628 A | 11/1999 | Tuenge et al. |
| 5,986,796 A | 11/1999 | Miles |
| 6,008,781 A | 12/1999 | Furness, III et al. |
| 6,028,656 A | 2/2000 | Buhrer et al. |
| 6,030,089 A | 2/2000 | Parker et al. |
| 6,034,807 A | 3/2000 | Little et al. |
| 6,040,937 A | 3/2000 | Miles |
| 6,046,840 A | 4/2000 | Huibers |
| 6,055,090 A | 4/2000 | Miles |
| 6,079,838 A | 6/2000 | Parker et al. |
| 6,154,586 A | 11/2000 | MacDonald et al. |
| 6,158,867 A | 12/2000 | Parker et al. |
| 6,162,657 A | 12/2000 | Schiele et al. |
| 6,172,797 B1 | 1/2001 | Huibers |
| 6,174,064 B1 | 1/2001 | Kalantar et al. |
| 6,201,633 B1 | 3/2001 | Peeters et al. |
| 6,201,664 B1 | 3/2001 | Le et al. |
| 6,206,550 B1 | 3/2001 | Fukushima et al. |
| 6,249,370 B1 | 6/2001 | Takeuchi et al. |
| 6,282,951 B1 | 9/2001 | Loga et al. |
| 6,288,824 B1 | 9/2001 | Kastalsky |
| 6,300,154 B2 | 10/2001 | Clark et al. |
| 6,300,294 B1 | 10/2001 | Robbins et al. |
| 6,317,103 B1 | 11/2001 | Furness, III et al. |
| 6,323,834 B1 | 11/2001 | Colgan et al. |
| 6,329,967 B1 | 12/2001 | Little et al. |
| 6,367,940 B1 | 4/2002 | Parker et al. |
| 6,388,661 B1 | 5/2002 | Richards |
| 6,402,335 B1 | 6/2002 | Kalantar et al. |
| 6,404,942 B1 | 6/2002 | Edwards et al. |
| 6,411,423 B2 | 6/2002 | Ham et al. |
| 6,424,329 B1 | 7/2002 | Okita |
| 6,471,879 B2 | 10/2002 | Hanson et al. |
| 6,473,220 B1 | 10/2002 | Clikeman et al. |
| 6,476,886 B2 | 11/2002 | Krusius et al. |
| 6,498,685 B1 | 12/2002 | Johnson |
| 6,504,985 B2 | 1/2003 | Parker et al. |
| 6,507,138 B1 | 1/2003 | Rodgers et al. |
| 6,508,563 B2 | 1/2003 | Parker et al. |
| 6,523,961 B2 | 2/2003 | Ilkov et al. |
| 6,531,947 B1 | 3/2003 | Weaver et al. |
| 6,535,311 B1 | 3/2003 | Lindquist |
| 6,556,261 B1 | 4/2003 | Krusius et al. |
| 6,567,063 B1 | 5/2003 | Okita |
| 6,567,138 B1 | 5/2003 | Krusius et al. |
| 6,574,033 B1 | 6/2003 | Chui et al. |
| 6,576,887 B2 | 6/2003 | Whitney et al. |
| 6,582,095 B1 | 6/2003 | Toyoda |
| 6,583,915 B1 | 6/2003 | Hong et al. |
| 6,589,625 B1 | 7/2003 | Kothari et al. |
| 6,591,049 B2 | 7/2003 | Williams et al. |
| 6,593,677 B2 | 7/2003 | Behin et al. |
| 6,600,474 B1 | 7/2003 | Heines et al. |
| 6,639,570 B2 | 10/2003 | Furness, III et al. |
| 6,639,572 B1 | 10/2003 | Little et al. |
| 6,650,455 B2 | 11/2003 | Miles |
| 6,650,822 B1 | 11/2003 | Zhou |
| 6,664,779 B2 * | 12/2003 | Lopes et al. .............. 324/158.1 |
| 6,666,561 B1 * | 12/2003 | Blakley ..................... 359/877 |
| 6,671,078 B2 | 12/2003 | Flanders et al. |
| 6,674,562 B1 | 1/2004 | Miles |
| 6,677,709 B1 | 1/2004 | Ma et al. |
| 6,678,029 B2 | 1/2004 | Suzuki et al. |
| 6,680,792 B2 | 1/2004 | Miles |
| 6,690,422 B1 | 2/2004 | Daly et al. |
| 6,701,039 B2 | 3/2004 | Bourgeois et al. |
| 6,710,538 B1 | 3/2004 | Ahn et al. |
| 6,710,908 B2 | 3/2004 | Miles et al. |
| 6,712,481 B2 | 3/2004 | Parker et al. |
| 6,731,355 B2 | 5/2004 | Miyashita |
| 6,731,492 B2 | 5/2004 | Goodwin-Johansson |
| 6,733,354 B1 | 5/2004 | Cathey et al. |
| 6,738,177 B1 | 5/2004 | Gutierrez et al. |
| 6,741,377 B2 | 5/2004 | Miles |
| 6,746,886 B2 | 6/2004 | Duncan et al. |
| 6,749,312 B2 | 6/2004 | Parker et al. |
| 6,752,505 B2 | 6/2004 | Parker et al. |
| 6,755,547 B2 | 6/2004 | Parker |
| 6,762,743 B2 | 7/2004 | Yoshihara et al. |
| 6,762,868 B2 | 7/2004 | Liu et al. |
| 6,764,796 B2 | 7/2004 | Fries |
| 6,775,048 B1 | 8/2004 | Starkweather et al. |
| 6,785,454 B2 | 8/2004 | Abe |
| 6,787,969 B2 | 9/2004 | Grade et al. |
| 6,794,119 B2 | 9/2004 | Miles |
| 6,796,668 B2 | 9/2004 | Parker et al. |
| 6,798,935 B2 | 9/2004 | Bourgeois et al. |
| 6,819,386 B2 | 11/2004 | Roosendaal et al. |
| 6,819,465 B2 | 11/2004 | Clikeman et al. |
| 6,825,470 B1 | 11/2004 | Bawolek et al. |
| 6,827,456 B2 | 12/2004 | Parker et al. |
| 6,831,678 B1 | 12/2004 | Travis |
| 6,835,111 B2 | 12/2004 | Ahn et al. |
| 6,844,959 B2 | 1/2005 | Huibers et al. |
| 6,857,751 B2 | 2/2005 | Penn et al. |
| 6,863,219 B1 | 3/2005 | Jacobsen et al. |
| 6,867,896 B2 | 3/2005 | Miles |
| 6,886,956 B2 | 5/2005 | Parker et al. |
| 6,887,202 B2 | 5/2005 | Currie et al. |

| | | | | | | |
|---|---|---|---|---|---|---|
| 6,897,164 B2 | 5/2005 | Baude et al. | | 2002/0141174 A1 | 10/2002 | Parker et al. |
| 6,900,072 B2 | 5/2005 | Patel et al. | | 2002/0163482 A1 | 11/2002 | Sullivan |
| 6,906,847 B2 | 6/2005 | Huibers et al. | | 2002/0163484 A1 | 11/2002 | Furness, III et al. |
| 6,911,964 B2 | 6/2005 | Lee et al. | | 2002/0171327 A1 | 11/2002 | Miller et al. |
| 6,919,981 B2 | 7/2005 | Clikeman et al. | | 2002/0185699 A1 | 12/2002 | Reid |
| 6,934,080 B2 | 8/2005 | Saccomanno et al. | | 2002/0196522 A1 | 12/2002 | Little et al. |
| 6,936,968 B2 | 8/2005 | Cross et al. | | 2003/0007344 A1 | 1/2003 | Parker |
| 6,939,013 B2 | 9/2005 | Asao | | 2003/0029705 A1 | 2/2003 | Qiu et al. |
| 6,940,631 B2 | 9/2005 | Ishikawa | | 2003/0036215 A1 | 2/2003 | Reid |
| 6,943,495 B2 | 9/2005 | Ma et al. | | 2003/0043157 A1 | 3/2003 | Miles |
| 6,947,195 B2 | 9/2005 | Ohtaka et al. | | 2003/0048036 A1 | 3/2003 | Lemkin |
| 6,953,375 B2 | 10/2005 | Ahn et al. | | 2003/0058543 A1 | 3/2003 | Sheedy et al. |
| 6,962,419 B2 | 11/2005 | Huibers | | 2003/0063233 A1 | 4/2003 | Takagi |
| 6,969,635 B2 | 11/2005 | Patel et al. | | 2003/0063234 A1 | 4/2003 | Oda et al. |
| 6,970,227 B2 | 11/2005 | Kida et al. | | 2003/0076649 A1 | 4/2003 | Speakman |
| 6,980,349 B1 | 12/2005 | Huibers et al. | | 2003/0081402 A1 | 5/2003 | Jeon et al. |
| 6,992,375 B2 | 1/2006 | Robbins et al. | | 2003/0085650 A1 | 5/2003 | Cathey et al. |
| 7,004,610 B2 | 2/2006 | Yamashita et al. | | 2003/0085867 A1 | 5/2003 | Grabert |
| 7,004,611 B2 | 2/2006 | Parker et al. | | 2003/0095081 A1 | 5/2003 | Furness, III et al. |
| 7,012,726 B1 | 3/2006 | Miles | | 2003/0095398 A1 | 5/2003 | Parker et al. |
| 7,012,732 B2 | 3/2006 | Miles | | 2003/0102810 A1 | 6/2003 | Cross et al. |
| 7,014,349 B2 | 3/2006 | Shinohara et al. | | 2003/0123245 A1 | 7/2003 | Parker et al. |
| 7,042,643 B2 | 5/2006 | Miles | | 2003/0123246 A1 | 7/2003 | Parker |
| 7,046,905 B1 | 5/2006 | Gardiner et al. | | 2003/0123247 A1 | 7/2003 | Parker et al. |
| 7,050,035 B2 | 5/2006 | Iisaka et al. | | 2003/0133284 A1 | 7/2003 | Chipchase et al. |
| 7,050,219 B2 | 5/2006 | Kimura | | 2003/0137499 A1 | 7/2003 | Iisaka |
| 7,057,790 B2 | 6/2006 | Selbrede | | 2003/0183008 A1 | 10/2003 | Bang et al. |
| 7,060,895 B2 | 6/2006 | Kothari et al. | | 2003/0184189 A1 | 10/2003 | Sinclair |
| 7,071,611 B2 | 7/2006 | Yonekubo et al. | | 2003/0190535 A1 | 10/2003 | Fries |
| 7,075,702 B2 | 7/2006 | Huibers et al. | | 2003/0190536 A1 | 10/2003 | Fries |
| 7,110,158 B2 | 9/2006 | Miles | | 2003/0202338 A1 | 10/2003 | Parker |
| 7,116,464 B2 | 10/2006 | Osawa et al. | | 2003/0231160 A1 | 12/2003 | Yoshihara et al. |
| 7,119,944 B2 | 10/2006 | Patel et al. | | 2004/0012946 A1 | 1/2004 | Parker et al. |
| 7,123,796 B2 | 10/2006 | Steckl et al. | | 2004/0058532 A1 | 3/2004 | Miles et al. |
| 7,161,094 B2 | 1/2007 | Kothari et al. | | 2004/0080484 A1 | 4/2004 | Heines et al. |
| 7,164,250 B2 | 1/2007 | Boscolo et al. | | 2004/0080927 A1 | 4/2004 | Parker et al. |
| 7,184,202 B2 | 2/2007 | Miles et al. | | 2004/0085749 A1 | 5/2004 | Parker et al. |
| 7,198,982 B2 | 4/2007 | Patel et al. | | 2004/0095739 A1 | 5/2004 | Parker et al. |
| 7,215,459 B2 | 5/2007 | Huibers et al. | | 2004/0100677 A1 | 5/2004 | Huibers et al. |
| 7,227,677 B2 | 6/2007 | Ravnkilde et al. | | 2004/0114346 A1 | 6/2004 | Parker et al. |
| 7,271,945 B2 | 9/2007 | Hagood et al. | | 2004/0122328 A1 | 6/2004 | Wang et al. |
| 7,274,416 B2 | 9/2007 | Feenstra et al. | | 2004/0125346 A1 | 7/2004 | Huibers |
| 7,291,363 B2 | 11/2007 | Miller | | 2004/0135273 A1 | 7/2004 | Parker et al. |
| 7,304,785 B2 | 12/2007 | Hagood et al. | | 2004/0135951 A1 | 7/2004 | Stumbo et al. |
| 7,304,786 B2 | 12/2007 | Hagood et al. | | 2004/0136204 A1 | 7/2004 | Asao |
| 7,315,294 B2 | 1/2008 | Richards | | 2004/0145580 A1 | 7/2004 | Perlman |
| 7,365,897 B2 | 4/2008 | Hagood et al. | | 2004/0165372 A1 | 8/2004 | Parker |
| 7,391,552 B2 | 6/2008 | Barton et al. | | 2004/0179146 A1 | 9/2004 | Nilsson |
| 7,405,852 B2 | 7/2008 | Brosnihan et al. | | 2004/0196215 A1 | 10/2004 | Duthaler et al. |
| 7,417,782 B2 | 8/2008 | Hagood et al. | | 2004/0207768 A1 | 10/2004 | Liu |
| 7,460,290 B2 | 12/2008 | Hagood, IV et al. | | 2004/0218149 A1 | 11/2004 | Huibers |
| 7,502,159 B2 | 3/2009 | Hagood, IV et al. | | 2004/0218154 A1 | 11/2004 | Huibers |
| 2001/0001260 A1 | 5/2001 | Parker et al. | | 2004/0218292 A1 | 11/2004 | Huibers |
| 2001/0028993 A1 | 10/2001 | Sanford | | 2004/0218293 A1 | 11/2004 | Huibers |
| 2001/0040538 A1 | 11/2001 | Quanrud | | 2004/0223088 A1 | 11/2004 | Huibers |
| 2001/0043208 A1 | 11/2001 | Furness, III et al. | | 2004/0223240 A1 | 11/2004 | Huibers |
| 2001/0053075 A1 | 12/2001 | Parker et al. | | 2004/0227428 A1 | 11/2004 | Sinclair |
| 2002/0001051 A1 | 1/2002 | Krusius et al. | | 2004/0233392 A1 | 11/2004 | Huibers |
| 2002/0009275 A1 | 1/2002 | Williams et al. | | 2004/0240032 A1 | 12/2004 | Miles |
| 2002/0015215 A1 | 2/2002 | Miles | | 2004/0246275 A1 | 12/2004 | Yoshihara et al. |
| 2002/0024641 A1 | 2/2002 | Ilkov et al. | | 2004/0263944 A1 | 12/2004 | Miles et al. |
| 2002/0024711 A1 | 2/2002 | Miles | | 2005/0002082 A1 | 1/2005 | Miles |
| 2002/0047172 A1 | 4/2002 | Reid | | 2005/0002086 A1 | 1/2005 | Starkweather et al. |
| 2002/0054424 A1 | 5/2002 | Miles | | 2005/0007759 A1 | 1/2005 | Parker |
| 2002/0054487 A1 | 5/2002 | Parker et al. | | 2005/0024849 A1 | 2/2005 | Parker et al. |
| 2002/0056900 A1 | 5/2002 | Liu et al. | | 2005/0062708 A1 | 3/2005 | Yoshihara et al. |
| 2002/0063661 A1 | 5/2002 | Comiskey et al. | | 2005/0063037 A1 | 3/2005 | Selebrede et al. |
| 2002/0070931 A1 | 6/2002 | Ishikawa | | 2005/0072032 A1 | 4/2005 | McCollum et al. |
| 2002/0075555 A1 | 6/2002 | Miles | | 2005/0088404 A1 | 4/2005 | Heines et al. |
| 2002/0080598 A1 | 6/2002 | Parker et al. | | 2005/0093465 A1 | 5/2005 | Yonekubo et al. |
| 2002/0126364 A1 | 9/2002 | Miles | | 2005/0094240 A1 | 5/2005 | Huibers et al. |
| 2002/0126387 A1 | 9/2002 | Ishikawa et al. | | 2005/0094418 A1 | 5/2005 | Parker |
| 2002/0132389 A1 | 9/2002 | Patel et al. | | 2005/0104804 A1 | 5/2005 | Feenstra et al. |

| | | |
|---|---|---|
| 2005/0111238 A1 | 5/2005 | Parker |
| 2005/0111241 A1 | 5/2005 | Parker |
| 2005/0122560 A1 | 6/2005 | Sampsell et al. |
| 2005/0122591 A1 | 6/2005 | Parker et al. |
| 2005/0123243 A1 | 6/2005 | Steckl et al. |
| 2005/0128370 A1 | 6/2005 | Moon |
| 2005/0134805 A1 | 6/2005 | Conner et al. |
| 2005/0141076 A1 | 6/2005 | Bausenwein et al. |
| 2005/0151940 A1 | 7/2005 | Asao |
| 2005/0157376 A1 | 7/2005 | Huibers et al. |
| 2005/0171408 A1 | 8/2005 | Parker |
| 2005/0195468 A1 | 9/2005 | Sampsell |
| 2005/0207154 A1 | 9/2005 | Parker |
| 2005/0207178 A1 | 9/2005 | Parker |
| 2005/0212734 A1 | 9/2005 | Kimura |
| 2005/0213183 A9 | 9/2005 | Miles |
| 2005/0213322 A1 | 9/2005 | Parker |
| 2005/0213323 A1 | 9/2005 | Parker |
| 2005/0213349 A1 | 9/2005 | Parker |
| 2005/0219679 A1 | 10/2005 | Ishikawa |
| 2005/0219680 A1 | 10/2005 | Ishikawa |
| 2005/0225501 A1 | 10/2005 | Srinivasan et al. |
| 2005/0225519 A1 | 10/2005 | Naugler, Jr. |
| 2005/0225732 A1 | 10/2005 | Conner et al. |
| 2005/0225827 A1 | 10/2005 | Kastalsky |
| 2005/0237596 A1 | 10/2005 | Selbrede |
| 2005/0242710 A1 | 11/2005 | Yamazaki et al. |
| 2005/0243023 A1 | 11/2005 | Reddy et al. |
| 2005/0244099 A1 | 11/2005 | Pasch et al. |
| 2005/0244949 A1 | 11/2005 | Miles |
| 2005/0253779 A1 | 11/2005 | Feenstra et al. |
| 2005/0258571 A1 | 11/2005 | Dumond et al. |
| 2005/0259198 A1 | 11/2005 | Lubart et al. |
| 2005/0285816 A1 | 12/2005 | Glass |
| 2005/0286114 A1 | 12/2005 | Miles |
| 2006/0004928 A1 | 1/2006 | Hess et al. |
| 2006/0007701 A1 | 1/2006 | Schoellmann et al. |
| 2006/0028817 A1 | 2/2006 | Parker |
| 2006/0028840 A1 | 2/2006 | Parker |
| 2006/0028841 A1 | 2/2006 | Parker |
| 2006/0028843 A1 | 2/2006 | Parker |
| 2006/0028844 A1 | 2/2006 | Parker |
| 2006/0033676 A1 | 2/2006 | Faase et al. |
| 2006/0033975 A1 | 2/2006 | Miles |
| 2006/0044246 A1 | 3/2006 | Mignard |
| 2006/0044928 A1 | 3/2006 | Chui et al. |
| 2006/0092490 A1 | 5/2006 | McCollum et al. |
| 2006/0132383 A1 | 6/2006 | Gally et al. |
| 2006/0132404 A1 | 6/2006 | Hayes et al. |
| 2006/0152476 A1 | 7/2006 | Van Gorkom et al. |
| 2006/0187190 A1 | 8/2006 | Hagood et al. |
| 2006/0187191 A1 | 8/2006 | Hagood et al. |
| 2006/0209012 A1 | 9/2006 | Hagood |
| 2006/0250676 A1 | 11/2006 | Hagood |
| 2006/0256039 A1 | 11/2006 | Hagood et al. |
| 2006/0262060 A1 | 11/2006 | Amundson |
| 2006/0262380 A1 | 11/2006 | Miles |
| 2006/0291034 A1 | 12/2006 | Patry et al. |
| 2006/0291771 A1 | 12/2006 | Braunisch et al. |
| 2007/0002413 A1 | 1/2007 | Psaltis et al. |
| 2007/0007889 A1 | 1/2007 | Bongaerts et al. |
| 2007/0035808 A1 | 2/2007 | Amundson et al. |
| 2007/0040982 A1 | 2/2007 | Nakano et al. |
| 2007/0052660 A1 | 3/2007 | Montbach et al. |
| 2007/0053652 A1 | 3/2007 | Mignard et al. |
| 2007/0086078 A1 | 4/2007 | Hagood et al. |
| 2007/0091038 A1 | 4/2007 | Hagood et al. |
| 2007/0195026 A1 | 8/2007 | Hagood et al. |
| 2007/0205969 A1 | 9/2007 | Hagood et al. |
| 2007/0216987 A1 | 9/2007 | Hagood et al. |
| 2007/0247401 A1 | 10/2007 | Sasagawa et al. |
| 2007/0279727 A1 | 12/2007 | Gandhi et al. |
| 2008/0030827 A1 | 2/2008 | Hagood et al. |
| 2008/0037104 A1 | 2/2008 | Hagood et al. |
| 2008/0062500 A1 | 3/2008 | Hagood |
| 2008/0094853 A1 | 4/2008 | Kim et al. |
| 2008/0129681 A1 | 6/2008 | Hagood et al. |
| 2008/0145527 A1 | 6/2008 | Hagood et al. |
| 2008/0158635 A1 | 7/2008 | Hagood et al. |
| 2008/0158636 A1 | 7/2008 | Hagood et al. |
| 2008/0174532 A1 | 7/2008 | Lewis |
| 2008/0278798 A1 | 11/2008 | Hagood et al. |
| 2008/0283175 A1 | 11/2008 | Hagood et al. |
| 2009/0034052 A1 | 2/2009 | Hagood et al. |

FOREIGN PATENT DOCUMENTS

| | | |
|---|---|---|
| EP | 0 415 625 A2 | 3/1991 |
| EP | 0 359 450 B1 | 11/1994 |
| EP | 0 495 273 B1 | 9/1996 |
| EP | 0 415 625 B1 | 1/1997 |
| EP | 0 751 340 A2 | 1/1997 |
| EP | 0 884 525 A2 | 12/1998 |
| EP | 0 751 340 B1 | 5/2000 |
| EP | 1 202 096 A2 | 5/2002 |
| EP | 1 426 190 A1 | 6/2004 |
| EP | 1 533 853 A2 | 5/2005 |
| FR | 2 726 135 | 10/1994 |
| JP | 03-142409 | 6/1991 |
| JP | 04-249203 | 9/1992 |
| JP | 09-198906 | 7/1997 |
| JP | 11-015393 | 1/1999 |
| JP | 2002-318564 A | 10/2002 |
| JP | 2003-162904 | 6/2003 |
| WO | WO 94/01716 | 1/1994 |
| WO | WO 98/04950 | 2/1998 |
| WO | WO 99/01696 | 1/1999 |
| WO | WO 00/50807 | 8/2000 |
| WO | WO 03/008860 A1 | 1/2003 |
| WO | WO 03/050448 A1 | 7/2003 |
| WO | WO 03/061329 A2 | 7/2003 |
| WO | WO 2004/019120 A1 | 3/2004 |
| WO | WO 2004/086098 A2 | 10/2004 |
| WO | WO-2004/088629 | 10/2004 |
| WO | WO 2005/001892 A2 | 1/2005 |
| WO | WO 2005/062908 A2 | 7/2005 |
| WO | WO 2006/0179129 A2 | 2/2006 |
| WO | WO 2006/023077 A2 | 3/2006 |
| WO | WO 2006/039315 A2 | 4/2006 |
| WO | WO 2006/052755 A2 | 5/2006 |

OTHER PUBLICATIONS

Feng et al, "Novel integrated light-guide plates for liquid crystal display backlight," J. Opt. A: Pure Appl. Opt., 7:111-117(2005).
Kalantar et al, "Optical Micro Deflector Based Functional Light-Guide Plate for Backlight Unit," SID 00 Digest, 1029-1031(2000).
Ravnkilde et al, "Fabrication of Nickel Microshutter Arrays for Spatial Light Modulation", (Aug. 2002).
"Prism Brightness Enhancement Films," 3M Corporation, http://products3.3m.com/catalog/us/en001/electronics_mfg/vikuiti/node_V6G78RBQ5Tbe/root_GST1T4S9TCgv/vroot_S6Q2FD9X0Jge/gvel_GD378D0HGJgI/theme_us_vikuiti_3_0/command_AbcPageHandler/output_html Retrieved on Aug. 3, 2006.
Wang et al, "Highly Space-Efficient Electrostatic Zigzag Transmissive Micro-Optic Switches for an Integrated MEMS Optical Display System," (2003).
Lee et al, "P-25: A LCOS Microdisplay Driver with Frame Buffering Pixels," SID 02 Digest, 292-295(2002).
McLaughlin, "Progress in Projection and Large-Area Displays," Proceedings of the IEEE, 90(4):521-532(Apr. 2002).
Sato, "Research on Flexible Display Systems," Broadcast Technology, 21:10-15(2005).
Doane, et al, "Display Technologies in Russia, Ukraine, and Belarus," World Technology Evaluation Center Panel Report (Dec. 1994).

Okumura et al, "Highly-efficient backlight for liquid crystal display having no optical films," Applied Physics Letters, 83(13):2515-2517 (Sep. 2003).

Funamoto et al, "Diffusive-sheetless Backlight System for Mobile Phone," IDW/AD, 1277-1280(2005).

"Optical Design Tools for Backlight Displays," Optical Research Associates, 1-8, (2002).

"BLU," Heesung Precision Ltd., http://www.hspr.co.kr/eng/product/blu.asp Retrieved on Aug. 3, 2006.

Teijido, J.M., "Conception and Design of Illumination Light Pipes," Thesis No. 1498 for University of Neuchatel, http://www.unige.ch/cyberdocuments/unine/theses2000/TeijidoJM/these_front.htm I:1-99 Retrieved on Aug. 3, 2006.

"Prism Sheet," Mitsubishi Rayon America Inc., http://www.mrany.com/data/HTML/29.htm Retrieved on Aug. 4, 2006.

"Two Proprietary Technologies Supporting OMRON Backlight," OMRON Electronics Corporation, http:/www.omron.co.jp/ecb/products/bklight/english/genri/index.html Retrieved on Aug. 3, 2006.

"MicroLens™—Re-Inventing LCD Backlighting," Global Lighting Technologies Inc., http://www.glthome.com/tech.htm Retrieved on Aug. 3, 2006.

Liu et al, "Scaling Laws of Microactuators and Potential Applications of Electroactive Polymers in MEMS," SPIE, 3669:345-354(Mar. 1999).

Vangbo et al, "A lateral symmetrically bistable buckled beam," J. Micromech. Microeng., 8:29-32(1998).

Shikida et al, "Fabrication fo an S-shaped Microactuator," Journal of Microelectromechanical Systems, 6(1):18-24(Mar. 1997).

Qui et al, "A High-Current Electrothermal Bistable MEMS Relay," (2003).

Qiu et al, "A Curved-Beam Bistable Mechanism," Journal of Microelectromechanical Systems, 13(2):137-145(Apr. 2004).

Yasumura et al, "Fluid Damping of an Electrostatic Actuator for Optical Switching Appilcations," Transducers Research Foundation (2002).

Underwood, "LCoS through the looking glass," SID(2001).

Clark et al, "FLC Microdisplays," Ferroelectrics, 246:97-110(2000).

Boeuf, "Plasma display panels: physics, recent developments and key issues," J. Phys. D: Appl, Phys., 36:R53-R79(2003).

Hornbeck, "Digital Light Processing™: A New MEMS-Based Display Technology," Texas Instruments, (1996).

Yamada et al, "52.2: Invited Paper:Color Sequential LCD Based on OCB with an LED Backlight," SID 00 Digest, 1180-1183(2000).

Jepsen et al, "4.11: 0.9" SXGA Liquid Crystal on Silicon Panel with 450 Hz. Field Rate, MicroDisplay Coropration, 106-109, (2001).

Birch et al, "31.1: SXGA Resolution FLC Microdisplays," SID 02 Digest, 954-957(2002).

Koden et al, "Ferroelectric Liquid Crystal Display," (Sep. 17, 1997).

Jones et al, "29-1: Addressing τVmin Ferroelectric Liquid Crystal Displays," (1998).

Akimoto et al, "15.1: A 0.9-in UXGA/HDTV FLC Microdisplay," SID 00 Digest, 194-197(2000).

Bryan-Brown, "Ultra Low Poer Bistable LCDs," SID 00, 76-79(2000).

Hewlett et al, "DLP Cinema™ projection: A hybrid frame-rate technique for flicker-free performance," Journ of the SID 9/3, 221-226(2001).

Underwood, "A review of microdisplay technologies," SID@EID, (Nov. 21 to 23, 2000).

Blackstone, "Making MEMS Reliable," SPIE's OEMagazine, 32-34(Sep. 2002).

Mastrangelo et al, "Mechanical Stability and Adhesion of Microstructures Under Capillary Forces—Part I: Basic Theory," Journal of Microelectromechanical Systems, 2(1):33-43(Mar. 1993).

Mastrangelo et al, "Mechanical Stability and Adhesion of Microstructures Under Capillary Forces—Part II: Experiments," Journal of Microelectromechanical Systems, 2(1):44-55(Mar. 1993).

Johnstone et al, "Theoretical limits on the freestanding length of cantilevers produced by surface micromachining technology," J. Micromech. Microeng. 12:855-861(2002).

Maboudian et al, "Stiction reduction processes for surface micromachines," Tribology Letters, 3:215-221(1997).

"Electronic Display Lighting Tutorials," 3M Corporation, file?//D:/Optical\Vikuiti Tutorial.htm. retrieved on Aug. 10, 2006.

Roosendaal et al, "25.2: A Wide Gamut, High Aperture Mobile Spectrum Sequential Liquid Crystal Display," SID 05 Digest, 1116-1119(2005).

Feng, "High Quality Light Guide Plates that Can Control the Illumination Angle Based on Microprism Structures," Applied Physics Letters, 85(24):6016-6018(Dec. 2004).

Tagaya et al, "Thin Liquid-Crystal Display Backlight System with Highly Scattering Optical Transmission Polymers," Applied Optics, 40(34):6274-6280(Dec. 2001).

Davis, "Light Emitting Diode Source Modeling for Optical Design," Reflexite Display Optics(Oct. 2004).

Foley, "NE04-21: Microstructured Plastic Optics for Display, Lighting, and Telecommunications Applications," Fresnel Optics(2001).

"Microprism Technology for Liminaires," Reflexite Display Optics(2004).

Davis, "Microstructured Optics for LED Applications," Reflexite Display Optics, (2002).

Alt et al, "A Gray-Scale Addressing Technique for Thin-Film-Transistor/Liquid Crystal Displays," IBM J. Res. Develop., 36(1):11-22(Jan. 1992).

Takatori et al, "6.3: Field-Sequential Smectic LCD with TFT Pixel Amplifier," SID 01 Digest, 48-51(2001).

Hartman, "4.1: Invited paper: Two-Terminal Devices Technologies for AMLCDs," SID 95 Digest, 7-10(1995).

Feenstra et al, "Electrowetting Displays," Liquavista BV, http://www.liquavista.com/documents/electrowetting_displays_whitepaper.pdf, Retrieved on Aug. 17, 2006.

Bozler et al, "Arrays of gated field-emitter cones having 0.32 μm tip-to-tip spacing," J. Vec. Sci. Technol. B, 12(2):629-632(Mar./Apr. 1994).

Goddhue et al, "Bright-field analysis of field-emission cones using high-resolution tranmission electron microscopy and the effect of structural properties on current stability," J. Vac. Sci. Technol. B, 12(2):693-696(Mar.Apr. 1994).

Liang et al, "Observation of electric field gradients near field-emission cathode arrays," Appl Phys. Lett., 66(9):1147-1149(Feb. 1995).

Kalantar, "Modulation of viewing angle on an LCD surface through backlight optics," Journal of the SID, 11(4):647-652(2003).

Den Boer, "Active Matrix Liquid Crystal Displays," Elsevier Science & Technology Books, ISBN #0750678135, Aug. 2005.

Kim, C.W., et al., "Manufacturing Technologies for the Next Generation a-Si TFT-LCD," Proceedings of the Int'l. Display Mfg. Cnf. Seoul, Korea (2000).

Park, Y.I., et al., "Active Matrix OLED Displays Using Simple Poly-Si TFT Process," Society of Information Display, Digest, pp. 487-489 (2003).

* cited by examiner

METHODS AND APPARATUS FOR SPATIAL LIGHT MODULATION

CROSS-REFERENCE TO RELATED APPLICATIONS

This application is a continuation of, and claims priority to and benefit of, U.S. Utility Patent Application Ser. No. 11/218690 filed on Sep. 2, 2005, entitled "Methods and Apparatus for Spatial Light Modulation", which claims the priority to and benefit of Provisional Patent Application No. 60/676,053, entitled "MEMS Based Optical Display" and filed on Apr. 29, 2005; and U.S. Provisional Patent Application No. 60/655,827, entitled "MEMS Based Optical Display Modules" and filed on Feb. 23, 2005. The entirety of each of these applications is incorporated herein by reference.

FIELD OF THE INVENTION

In general, the invention relates to the field of spatial light modulation, in particular, the invention relates to displays having improved backlights.

BACKGROUND OF THE INVENTION

Displays built from mechanical light modulators are an attractive alternative to displays based on liquid crystal technology. Mechanical light modulators are fast enough to display video content with good viewing angles and with a wide range of color and grey scale. Mechanical light modulators have been successful in projection display applications. Backlit displays using mechanical light modulators have not yet demonstrated sufficiently attractive combinations of brightness and low power. When operated in transmissive mode many mechanical light modulators, with aperture ratios in the range of 10 and 20%, are only capable of delivering 10 to 20% of available light from the backlight to the viewer for the production of an image. Combining the mechanical apertures with color filters reduces the optical efficiency to about 5%, i.e., no better than the efficiencies available in current color liquid crystal displays. There is a need for a low-powered display having increased luminous efficiency.

SUMMARY OF THE INVENTION

The devices and methods described herein provide for mechanical light modulators having improved luminous efficiency, making mechanical actuators attractive for use in portable and large area displays. In some cases, the transmittance or optical efficiency of mechanical modulators coupled to backlights can be improved to the 40 to 60% level, or 10 times more efficient than what is typical in a liquid crystal display. In addition, the devices and methods described herein can be incorporated into small-size, high resolution displays, regardless of the light modulation mechanism, to improve the brightness of the displays and to reduce the power requirements in a display application.

The light modulators described herein make possible portable video displays that can be both bright and low power. The light modulators can be switched fast enough to provide color images using time sequential color techniques, instead of relying on color filters. The displays can be built using as few as three functional layers to form both a mechanical shutter assembly and the electrical connections necessary for array addressing.

In one aspect, the invention relates to a spatial light modulator which includes a first reflective surface and a second reflective surface. The first reflective surface defines a number of light-transmissive regions, such as apertures, filters, or liquid crystal components. The second reflective surface at least partially faces the first reflective surface and reflects light towards the light-transmissive regions defined by the first reflective surface. The reflective surfaces may be mirrors, dielectric mirrors, or thin functional films. In one embodiment the first reflective surface is parallel or substantially parallel to the second reflective surface. In another embodiment, the reflective surfaces are at least partially transverse to one another. The space between the first and second reflective surfaces defines the area of a substantially transparent optical cavity.

In one embodiment, the spatial light modulator includes an array of light modulators for selectively obstructing the light-transmissive regions. Obstructing may include, without limitation, partially or completely blocking, reflecting, deflecting, absorbing, or otherwise preventing light from reaching an intended viewer of the spatial light modulator. In one embodiment, the array of light modulators includes the first reflective surface. One feature of the light modulating elements in the array of light modulators is that they are individually controllable. In one embodiment, the light modulating elements may be MEMS-based shutter assemblies, and optionally may be bistable or deformnable shutters. The shutter assemblies include shutters that, in one implementation, are coated with a first film to absorb light striking the shutter from one direction and coated with a second film to reflect light striking the shutter from another direction. In one embodiment, the shutters move in a plane such that in one position the shutters substantially obstruct passage of light through corresponding light-transmissive regions, and in a second position, they allow light to pass through the light-transmissive regions. In another embodiment, the shutters move at least partially out of a plane defined by the array of shutter assemblies in which they are included. While substantially in the plane, the shutters obstruct passage of light through corresponding light-transmissive regions. While substantially out of the plane, the shutters allow light to pass through the light-transmissive regions. In another embodiment, the array of light modulators includes a plurality of liquid crystal cells.

In another embodiment, the spatial light modulator includes a light guide for distributing light throughout the light cavity. The reflective surfaces may be disposed directly on the front and rear surfaces of the light guide. Alternatively, the front reflective surface may be disposed on a separate substrate on which the array of light modulators is disposed. Similarly, the second reflective surface may be coupled directly to the rear side of the light guide, or it may be attached to a third surface. The substrate on which the array of light modulators is formed may be transparent or opaque. For opaque substrates, apertures are etched through the substrate to form light-transmissive regions. The substrate may be directly coupled to the light guide, or it may be separated from the light guide with one or more spacers or supports. In still a further embodiment, the spatial light modulator includes a diffuser or brightness enhancing film. The spatial light modulator may also include a light source, such as a light emitting diode.

In another aspect, the invention relates to a method of forming an image. The method includes introducing light into a reflective optical cavity. The reflective cavity includes a plurality of light-transmissive regions through which light can escape the reflective optical cavity. The method further includes forming an image by allowing the introduced light to escape the reflective optical cavity through at least one of the light-transmissive regions. In one embodiment, the escape of light is regulated by an array of light modulators that either obstruct light passing through the light-transmissive regions, or allow it to pass. In another embodiment, the method includes forming a color image by alternately illuminating a plurality of different colored light sources. In a further embodiment, the method includes reflecting at least a portion of ambient light striking unobstructed light-transmissive regions.

In still another aspect, the invention relates to a method of manufacturing a spatial light modulator comprising forming a substantially transparent cavity having first and second opposing sides into which light can be introduced. The method also includes coupling a first reflective surface to the first side of the transparent cavity such that the first reflective surface faces the interior of the transparent cavity. A plurality of light-transmissive regions are formed in the first reflective surface. In addition, the method includes coupling a second reflective surface to the second side of the transparent cavity such that the second reflective surface faces the interior transparent cavity.

In another aspect, the invention relates to a method of forming an image by receiving ambient light and positioning shutters formed on at least one substrate to selectively reflect the received ambient light to form the image.

BRIEF DESCRIPTION OF THE FIGURES

The system and methods may be better understood from the following illustrative description with reference to the following drawings in which.

DESCRIPTION OF CERTAIN ILLUSTRATIVE EMBODIMENTS

To provide an overall understanding of the invention, certain illustrative embodiments will now be described, including apparatus and methods for spatially modulating light. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1A:
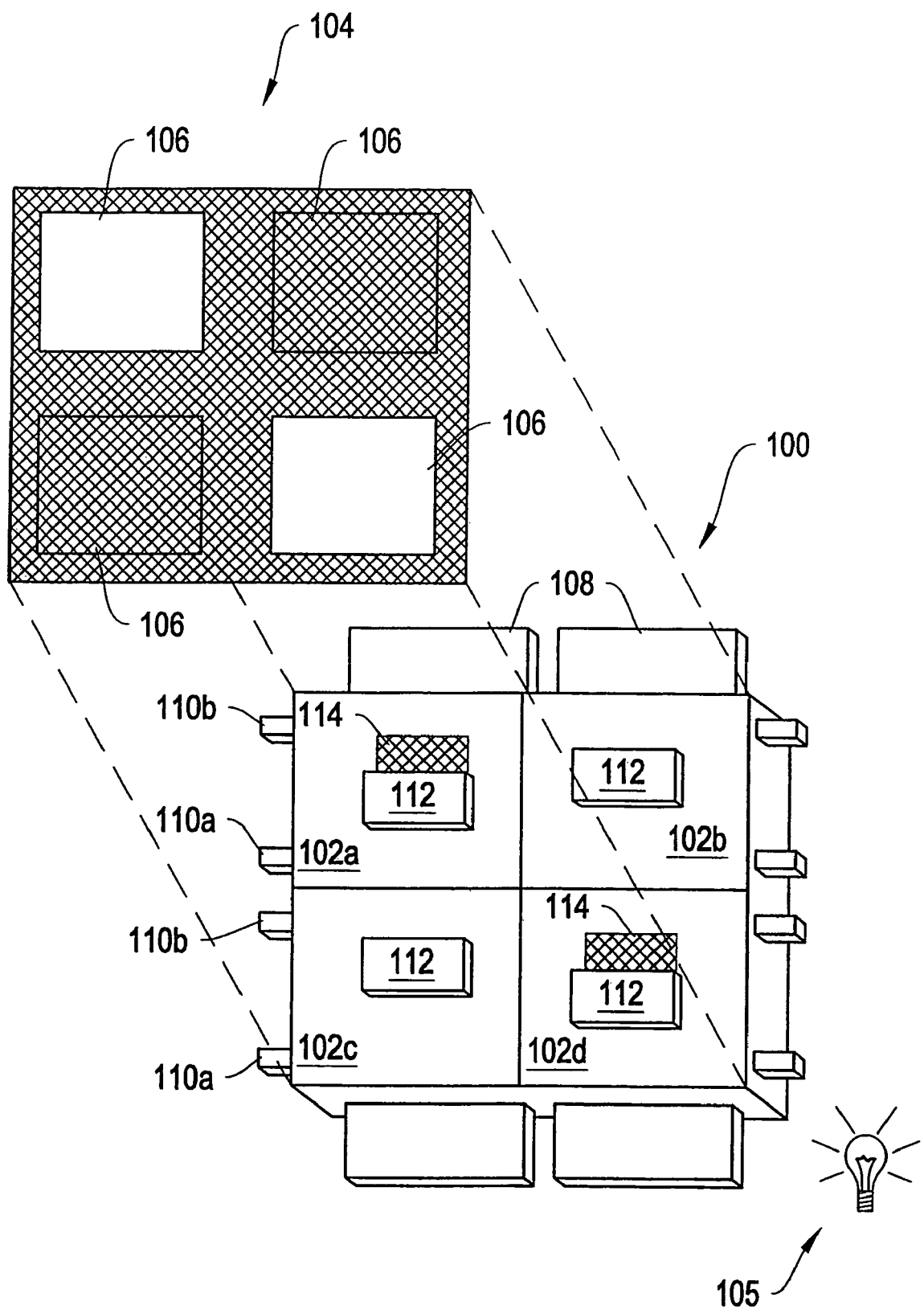
FIG. 1A is an isometric conceptual view of an array of light modulators, according to an illustrative embodiment of the invention.

FIG. 1A is an isometric conceptual view of an array 100 of light modulators (also referred to as a "light modulation array 100"), according to an illustrative embodiment of the invention. The light modulation array 100 includes a plurality of shutter assemblies 102a-102d (generally "shutter assemblies 102") arranged in rows and columns. In general, a shutter assembly 102 has two states, open and closed (although partial openings can be employed to impart grey scale). Shutter assemblies 102a and 102d are in the open state, allowing light to pass. Shutter assemblies 102b and 102c are in the closed state, obstructing the passage of light. By selectively setting the states of the shutter assemblies 102a-102d, the light modulation array 100 can be utilized to form an image 104 for a projection or backlit display, illuminated by lamp 105. In the light modulation array 100, each shutter assembly corresponds to a pixel 106 in the image 104. In alternative implementations, a light modulation array includes three color-specific shutter assemblies for each pixel. By selectively opening one or more of the color-specific shutter assemblies corresponding to the pixel, the shutter assembly can generate a color pixel in the image.

The state of each shutter assembly 102 can be controlled using a passive matrix addressing scheme. Each shutter assembly 102 is controlled by a column electrode 108 and two row electrodes 110a (a "row open electrode") and 110b (a "row close electrode"). In the light modulation array 100, all shutter assemblies 102 in a given column share a single column electrode 108. All shutter assemblies in a row share a common row open electrode 110a and a common row close electrode 110b. An active matrix addressing scheme is also possible. Active matrix addressing (in which pixel and switching voltages are controlled by means of a thin film transistor array) is useful in situations in which the applied voltage must be maintained in a stable fashion throughout the period of a video frame. An implementation with active matrix addressing can be constructed with only one row electrode per pixel.

In the passive matrix addressing scheme, to change the state of a shutter assembly 102 from a closed state to an open state, i.e., to open the shutter assembly 102, the light modulation array 100 applies a potential to the column electrode 108 corresponding to the column of the light modulation array 100 in which the shutter assembly 102 is located and applies a second potential, in some cases having an opposite polarity, to the row open electrode 110a corresponding to the row in the light modulation array 100 in which the shutter assembly 102 is located. To change the state of a shutter assembly 102 from an open state to a closed state, i.e., to close the shutter assembly 102, the light modulation array 100 applies a potential to the column electrode 108 corresponding to the column of the light modulation array 100 in which the shutter assembly 102 is located and applies a second potential, in some cases having an opposite polarity, to the row close electrode 110b corresponding to the row in the light modulation array 100 in which the shutter assembly 102 is located. In one implementation, a shutter assembly changes state in response to the difference in potential applied to the column electrode and one of the row electrodes 110a or 110b exceeding a predetermined switching threshold.

To form an image, in one implementation, light modulation array 100 sets the state of each shutter assembly 102 one row at a time in sequential order. For a given row, the light modulation array 100 first closes each shutter assembly 102 in the row by applying a potential to the corresponding row close electrode 110b and a pulse of potential to all of the column electrodes 108. Then, the light modulation array 100 opens the shutter assemblies 102 through which light is to pass by applying a potential to the row open electrode 110a and applying a potential to the column electrodes 108 for the columns which include shutter assemblies in the row which are to be opened. In one alternative mode of operation, instead of closing each row of shutter assemblies 102 sequentially, after all rows in the light modulation array 100 are set to the proper position to form an image 104, the light modulation array 100 globally resets all shutter assemblies 102 at the same time by applying a potentials to all row close electrodes 110b and all column electrodes 108 concurrently. In another alternative mode of operation, the light modulation array 100 forgoes resetting the shutter assemblies 102 and only alters the states of shutter assemblies 102 that need to change state to display a subsequent image 104.

In addition to the column electrode 108 and the row electrodes 110a and 110b, each shutter assembly includes a shutter 112 and an aperture 114. To illuminate a pixel 106 in the image 104, the shutter is positioned such that it allows light to pass, without any significant obstruction, through, the aperture 114 towards a viewer. To keep a pixel unlit, the shutter 112 is positioned such that it obstructs the passage of light through the aperture 114. The aperture 114 is defined by an area etched through a reflective material in each shutter assembly, such as the column electrode 108. The aperture 114 may be filled with a dielectric material.

Figure 1B:
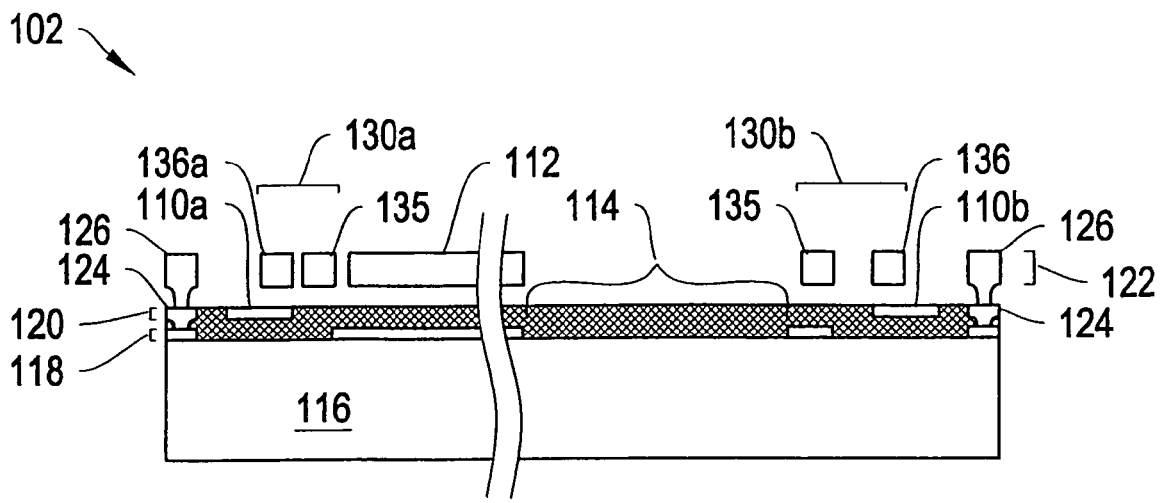
FIG. 1B is a cross-sectional view of a shutter assembly included in the array of light modulators of FIG. 1A, according to an illustrative embodiment of the invention.

FIG. 1B is a cross sectional diagram (see line A-A' below in FIG. 1D) of one of the shutter assemblies 102 of FIG. 1A, illustrating additional features of the shutter assemblies 102. Referring to FIGS. 1A and 1B, the shutter assembly 102 is built on a substrate 116 which is shared with other shutter assemblies 102 of the light modulation array 100. The substrate 116 may support as many as 4,000,000 shutter assemblies, arranged in up to about 2000 rows and up to about 2000 columns.

As described above, the shutter assembly 102 includes a column electrode 108, a row open electrode 110a, a row close electrode 110b, a shutter 112, and an aperture 114. The column electrode 108 is formed from a substantially continuous layer of reflective metal, the column metal layer 118, deposited on the substrate 116. The column metal layer 118 serves as the column electrode 108 for a column of shutter assemblies 102 in the light modulation array 100. The continuity of the column metal layer 118 is broken to electrically isolate one column electrode 108 from the column electrodes 108 of shutter assemblies 102 in other columns of the light modulation array 100. As mentioned above, each shutter assembly 102 includes an aperture 114 etched through the column metal layer 118 to form a light-transmissive region.

The shutter assembly includes a row metal layer 120, separated from the column metal layer 118 by one or more intervening layers of dielectric material or metal. The row metal layer 120 forms the two row electrodes 110a and 110b shared by a row of shutter assemblies 102 in light modulation array 100. The row metal layer 120 also serves to reflect light passing through gaps in the column metal layer 118 other than over the apertures 114. The column metal layer and the row metal layer are between about 0.1 and about 2 microns thick. In alternative implementations, such as depicted in FIG. 1D (described below), the row metal layer 120 can be located below the column metal layer 118 in the shutter assembly 102.

The shutter 102 assembly includes a third functional layer, referred to as the shutter layer 122, which includes the shutter 112. The shutter layer 122 can be formed from metal or a semiconductor. Metal or semiconductor vias 124 electrically connect the column metal layer 118 and the row electrodes 110a and 110b of the row metal layer 120 to features on the shutter layer 122. The shutter layer 122 is separated from the row metal layer 120 by a lubricant, vacuum or air, providing the shutter 112 freedom of movement.

Figure 1C:
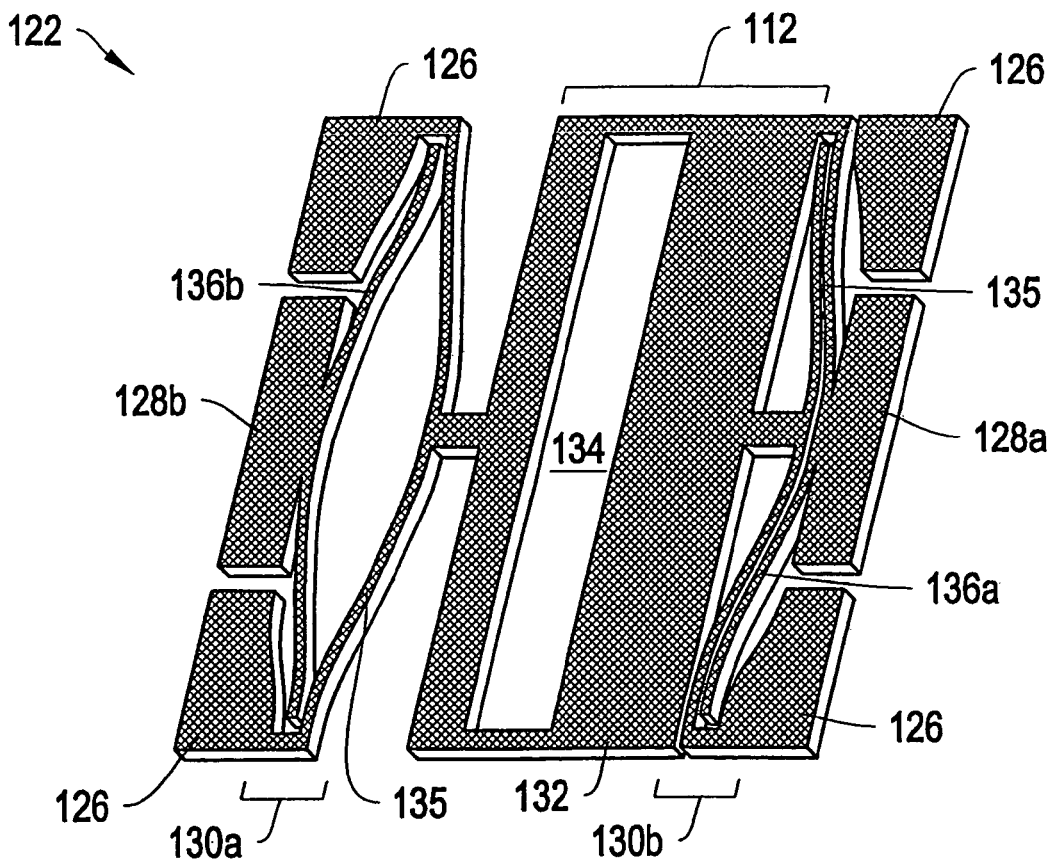
FIG. 1C is an isometric view of the shutter layer of the shutter assembly of FIG. 1B, according to an illustrative embodiment of the invention.
Figure 1D:
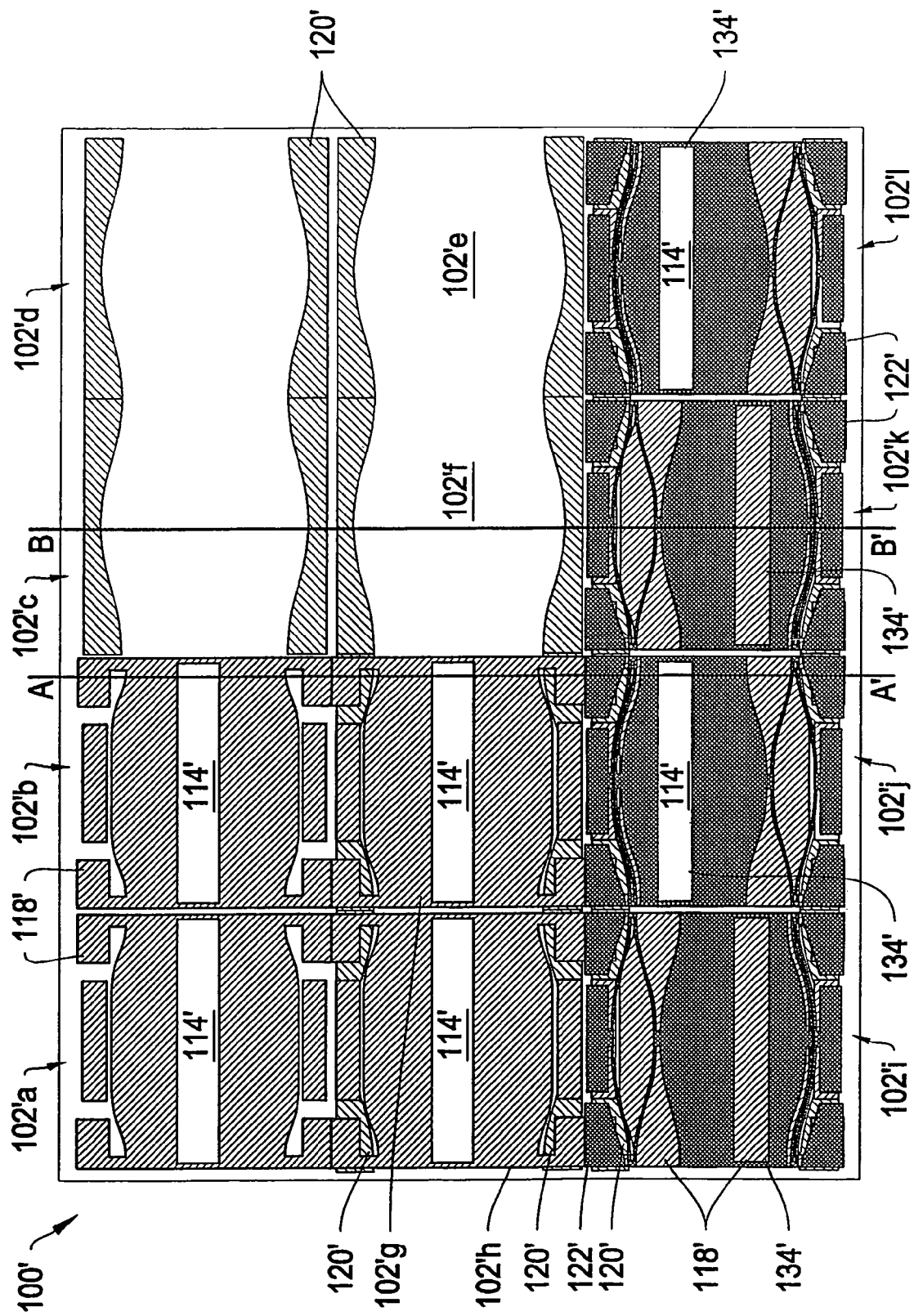
FIG. 1D is a top view of the various functional layers of a light modulation array, such as the light modulation array of FIG. 1A.

FIG. 1C is a isometric view of a shutter layer 122, according to an illustrative embodiment of the invention. Referring to both FIGS. 1B and 1C, the shutter layer 122, in addition to the shutter 112, includes four shutter anchors 126, two row anchors 128a and 128b, and two actuators 130a and 130b, each consisting of two opposing compliant beams. The shutter 112 includes an obstructing portion 132 and, optionally, as depicted in FIG. 1C, a shutter aperture 134. In the open state, the shutter 112 is either clear of the aperture 114, or the shutter aperture 134 is positioned over the aperture 134, thereby allowing light to pass through the shutter assembly 102. In the closed state, the obstructing portion 132 is positioned over the aperture, obstructing the passage of light through the shutter assembly 102. In alternative implementations, a shutter assembly 102 can include additional apertures 114 and the shutter 112 can include multiple shutter apertures 134. For instance, a shutter 112 can be designed with a series of narrow slotted shutter apertures 134 wherein the total area of the shutter apertures 134 is equivalent to the area of the single shutter aperture 134 depicted in FIG. 1C. In such implementations, the movement required of the shutter to move between open and closed states can be significantly reduced.

Each actuator 130a and 130b is formed from two opposing compliant beams. A first pair of compliant beams, shutter actuator beams 135, physically and electrically connects each end of the shutter 112 to the shutter anchors 126, located in each corner of the shutter assembly 102. The shutter anchors 126, in turn, are electrically connected to the column metal layer 118. The second pair of compliant beams, row actuator beams 136a and 136b extends from each row anchor 128a and 128b. The row anchor 128a is electrically connected by a via to the row open electrode 110a. The row anchor 128b is electrically connected by a via to the row close electrode 110b. The shutter actuator beams 135 and the row actuator beams 136a and 136b (collectively the "actuator beams 135 and 136") are formed from a deposited metal, such as Au, Cr or Ni, or a deposited semiconductor, such as polycrystalline silicon, or amorphous silicon, or from single crystal silicon if formed on top of a buried oxide (also known as silicon on insulator). The actuator beams 135 and 136 are patterned to dimensions of about 1 to about 20 microns in width, such that the actuator beams 135 and 136 are compliant.

FIG. 1D is a top-view of the various functional layers of a light modulation array 100', according to an illustrative embodiment of the invention. The light modulation array 100' includes twelve shutter assemblies 102'a-102'l, in various stages of completion. Shutter assemblies 102'a and 102'b include just the column metal layer 118' of the light modulation array 100'. Shutter assemblies 102'c-102'f include just the row metal layer 120' (i.e., the row open electrode and the row-close electrode) of the light modulation array 100'. Shutter assemblies 102'g and 102'h include the column metal layer 118' and the row metal layer 120'. In contrast to the shutter assembly 102 in FIG. 1B, the column metal layer 118' is deposited on top of the row metal layer 120'. Shutter assemblies 102'i-l depict all three functional layers of the shutter assemblies 102', the row metal layer 120', the column metal layer 118', and a shutter metal layer 122'. The shutter assemblies 102'i and 102'k are closed, indicated by the column metal layer 118' being visible through the shutter aperture 134' included in the shutter assemblies 102'i and 102'k. The shutter assemblies 102'j and 102'l are in the open position, indicated by the aperture 114' in the column metal layer 118' being visible in the shutter aperture 134'.

In other alternate implementations, a shutter assembly can include multiple apertures and corresponding shutters and actuators (for example, between, 1 and 10) per pixel. In changing the state of this shutter assembly, the number of actuators activated can depend on the switching voltage that is applied or on the particular combination of row and column electrodes that are chosen for receipt of a switching voltage. Implementations are also possible in which partial openings of an aperture is made possible in an analog fashion by providing a switching voltages partway between a minimum and a maximum switching voltage. These alternative implementations provide an improved means of generating a grey scale.

With respect to actuation of shutter assemblies 102, in response to applying a potential to the column electrode 108 of the shutter assembly 102, the shutter anchors 126, the shutter 112 and the shutter actuator beams 135 become likewise energized with the applied potential. In energizing one of the row electrodes 110a or 10b, the corresponding row anchor 128a or 128b and the corresponding row actuator beam 136a or 136b also becomes energized. If the resulting potential difference between a row actuator beam 136a or 136b and its opposing shutter actuator beam 135 exceeds a predetermined switching threshold, the row actuator beam 136a or 136b attracts its opposing shutter actuator beam 135, thereby changing the state of the shutter assembly 102.

As the actuator beams 135 and 136 are pulled together, they bend or change shape. Each pair of actuator beams 135 and 136 (i.e., a row actuator beam 134a or 134b and its opposing shutter actuator beam 135) can have one of two alternate and stable forms of curvature, either drawn together with parallel shapes or curvature, or held apart in a stable fashion with opposite signs to their of curvature. Thus, each pair is mechanically bi-stable. Each pair of actuator beams 135 and 136 is stable in two positions, one with the shutter 112 in an "open" position, and a second with the shutter 112 in a "closed" position. Once the actuator beams 135 and 136 reach one of the stable positions, no power and no applied voltage need be applied to the column electrode 108 or either row electrode 110a or 110b to keep the shutter 112 in that stable position. Voltage above a predetermined threshold needs to be applied to move the shutter 112 out of the stable position.

While both the open and closed positions of the shutter assembly 102 are energetically stable, one stable position may have a lower energy state than the other stable position. In one implementation, the shutter assemblies 102 are designed such that the closed position has a lower energy state than the open position. A low energy reset pulse can therefore be applied to any or all pixels in order to return the entire array to its lowest stress state, corresponding also to an all-black image.

The light modulation array 100 and its component shutter assemblies 102 are formed using standard micromachining techniques known in the art, including lithography; etching techniques, such as wet chemical, dry, and photoresist removal; thermal oxidation of silicon; electroplating and electroless plating; diffusion processes, such as boron, phosphorus, arsenic, and antimony diffusion; ion implantation; film deposition, such as evaporation (filament, electron beam, flash, and shadowing and step coverage), sputtering, chemical vapor deposition (CVD), epitaxy (vapor phase, liquid phase, and molecular beam), electroplating, screen printing, and lamination. See generally Jaeger, Introduction to Microelectronic Fabrication (Addison-Wesley Publishing Co., Reading Mass. 1988); Runyan, et al., Semiconductor Integrated Circuit Processing Technology (Addison-Wesley Publishing Co., Reading Mass. 1990); Proceedings of the IEEE Micro Electro Mechanical Systems Conference 1987-1998; Rai-Choudhury, ed., Handbook of Microlithography, Micromachining & Microfabrication (SPIE Optical Engineering Press, Bellingham, Wash. 1997).

More specifically, multiple layers of material (typically alternating between metals and dielectrics) are deposited on top of a substrate forming a stack. After one or more layers of material are added to the stack, patterns are applied to a top most layer of the stack marking material either to be removed from, or to remain on, the stack. Various etching techniques, including wet and/or dry etches, are then applied to the patterned stack to remove unwanted material. The etch process may remove material from one or more layers of the stack based on the chemistry of the etch, the layers in the stack, and the amount of time the etch is applied. The manufacturing process may include multiple iterations of layering, patterning, and etching.

The process also includes a release step. To provide freedom for parts to move in the resulting device, sacrificial material is interdisposed in the stack proximate to material that will form moving parts in the completed device. An etch removes much of the sacrificial material, thereby freeing the parts to move.

After release the surfaces of the moving shutter are insulated so that charge does not transfer between moving parts upon contact. This can be accomplished by thermal oxidation and/or by conformal chemical vapor deposition of an insulator such as Al2O3, Cr2O3, TiO2, HfO2, V2O5, Nb2O5, Ta2O5, SiO2, or Si3N4 or by depositing similar materials using techniques such as atomic layer deposition. The insulated surfaces are chemically passivated to prevent problems such as stiction between surfaces in contact by chemical conversion processes such as fluoridation or hydrogenation of the insulated surfaces.

Figure 2:
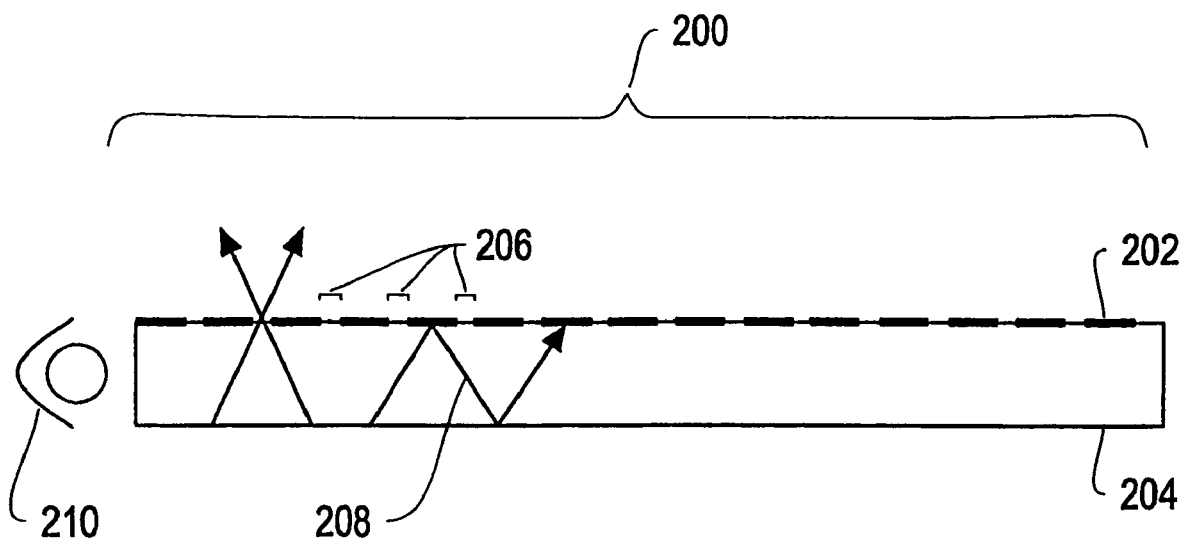
FIG. 2 is a cross-sectional view of an optical cavity for use in a spatial light modulator, according to an illustrative embodiment of the invention.

FIG. 2 is a cross-section of an optical cavity 200 for use in a spatial light modulator, according to an illustrative embodiment of the invention. The optical cavity 200 includes a front reflective surface 202 and a rear reflective surface 204. The front reflective surface 202 includes an array of light-transmissive regions 206 through which light 208 can escape the optical cavity 200. Light 208 enters the optical cavity 200 from one or more light sources 210. The light 206 reflects between the front and rear reflective surfaces 202 and 204 until it reflects through one of the light-transmissive regions 206. Additional reflective surfaces may be added along the sides of the optical cavity 200.

The front and rear reflective surfaces 202 and 204, in one implementation, are formed by depositing a metal or semiconductor onto either a glass or plastic substrate. In other implementations, the reflective surfaces 202 and 204 are formed by depositing metal or semiconductor on top of a dielectric film that is deposited as one of a series of thin films built-up on a substrate. The reflective surfaces 202 and 204 have reflectivities above about 50%. For example, the reflective surfaces 202 and 204 may have reflectivities of 70%, 85%, 96%, or higher.

Smoother substrates and finer grained metals yield higher reflectivities. Smooth surfaces may be obtained by polishing a glass substrate or by molding plastic into smooth-walled forms. Alternatively, glass or plastic can be cast such that a smooth surface is formed by the settling of a liquid/air interface. Fine grained metal films without inclusions can be formed by a number of vapor deposition techniques including sputtering, evaporation, ion plating, laser ablation, or chemical vapor deposition. Metals that are effective for this reflective application include, without limitation, Al, Cr, Au, Ag, Cu, Ni, Ta, Ti, Nd, Nb, Si, Mo and/or alloys thereof.

Alternatively, the reflective surface can be formed by interposing a dielectric material of low refractive index between a light guide in the optical cavity 200 and any of a series of thin films deposited on top of it. The change in refractive index between the light guide and the thin film leads to a condition of total internal reflection within the light guide, whereby incident light of sufficiently low incidence angle can be reflected with nearly 100% efficiency.

In the alternative, the reflective surfaces 202 or 204 can be formed from a mirror, such as a dielectric mirror. A dielectric mirror is fabricated as a stack of dielectric thin films which alternate between materials of high and low refractive index. A portion of the incident light is reflected from each interface where the refractive index changes. By controlling the thickness of the dielectric layers to some fixed fraction or multiple of the wavelength and by adding reflections from multiple parallel interfaces, it is possible to produce a net reflective surface having a reflectivity exceeding 98%. Some dielectric mirrors have reflectivities greater than 99.8%. Dielectric mirrors can be custom-designed to accept a pre-specified range of wavelengths in the visible range and to accept a pre-specified range of incident angles. Reflectivities in excess of 99% under these conditions are possible as long as the fabricator is able to control the smoothness in the dielectric film stacks. The stacks can include between about 20 and about 500 films.

In another alternative, the first and second reflective surfaces 202 or 204 are included in the optical cavity 200 as separate components. A thin sheet of polished stainless steel or aluminum can suffice for this purpose. Also, it is possible to produce a reflective metal surface or a dielectric mirror on the surface of a continuous sheet or roll of plastic. The sheet of reflective plastic can then be attached or adhered to other components in the optical cavity 200.

The light-transmissive regions 206 are arranged in an array to form pixels from which an image is formed. In the illustrative embodiment, the light-transmissive regions 206 are spaced between about 100 and about 350 microns apart. The light transmissive regions are oblong or rectangular in shape, wherein the greater dimension is between about 50 and about 300 microns while the narrower dimension is between 2 and 100 microns, though other shapes and sizes may be suitable. For projection displays the pitch can be as small as 20 microns, with aperture widths as small as 5 microns. The ratio between the area of the front reflective surface 202 taken up by light-transmissive regions 206 and the total area of the front reflective surface 202 is referred to herein as the transmissiveness ratio. Illustrative implementations of the optical cavity 200 have transmissiveness ratios of between about 5% and about 50%. Normally, spatial light modulators having such low transmissiveness ratios would emit insufficient light to form a usable image. To ensure greater light 208 emission from the optical cavity 200, the front and rear reflective surfaces 202 and 204 reflect the light 208 back and forth a number of times until the reflected light 208 passes through a light-transmissive region 206, or until the light 208 loses its energy from the reflections. Higher reflectivity surfaces result in more light 208 escaping from the optical cavity 200 to form an image.

Table 1, below, lists the percentage of light 208 introduced into the optical cavity 200 that escapes through the light-transmissive regions 206 (in terms of efficiency) for several transmissiveness ratio/reflectivity pairings.

TABLE 1

| Transmissiveness Ratio | Reflectivity | Efficiency |
| --- | --- | --- |
| 8% | 0.97 | 59% |
|  | 0.93 | 40% |
|  | 0.88 | 30% |
| 14% | 0.97 | 71% |
|  | 0.93 | 55% |
|  | 0.88 | 43% |
| 20% | 0.97 | 79% |
|  | 0.93 | 65% |
|  | 0.88 | 53% |

When the optical cavity 200 is used to form the basis of a transmissive display, one or more light sources 210 introduce light into the optical cavity 200. The light source(s) 210 may be of any suitable type, including, for example, any of the types disclosed in U.S. Pat. Nos. 4,897,771 and 5,005,108, the entire disclosures of which are incorporated herein by reference. In particular, the light source(s) 210 may be an arc lamp, an incandescent bulb which also may be colored, filtered or painted, a lens end bulb, a line light, a halogen lamp, a light emitting diode (LED), a chip from an LED, a neon bulb, a fluorescent tube, a fiber optic light pipe transmitting from a remote source, a laser or laser diode, or any other suitable light source. Additionally, the light sources may be a multiple colored LED, or a combination of multiple colored radiation sources 210 in order to provide a desired colored or white light output distribution. For example, a plurality of colored lights such as LEDs of different colors (red, blue, green) or a single LED with multiple colored chips may be employed to create white light or any other colored light output distribution by varying the intensities of each individual colored light. A reflector may be positioned proximate to the light source 210 to reflect light 208 emitted away from the optical cavity 200 towards the optical cavity 200. In one implementation, three light sources 210, one red light source 210, one green light source 210, and one blue light source 210, sequentially introduce light 208 into the optical cavity 200, alternating at frequencies in the range of 20 to 600 Hz. A rate in excess of 100 Hz is generally faster than what the human eye can detect, thus providing a color image.

Figure 3A:
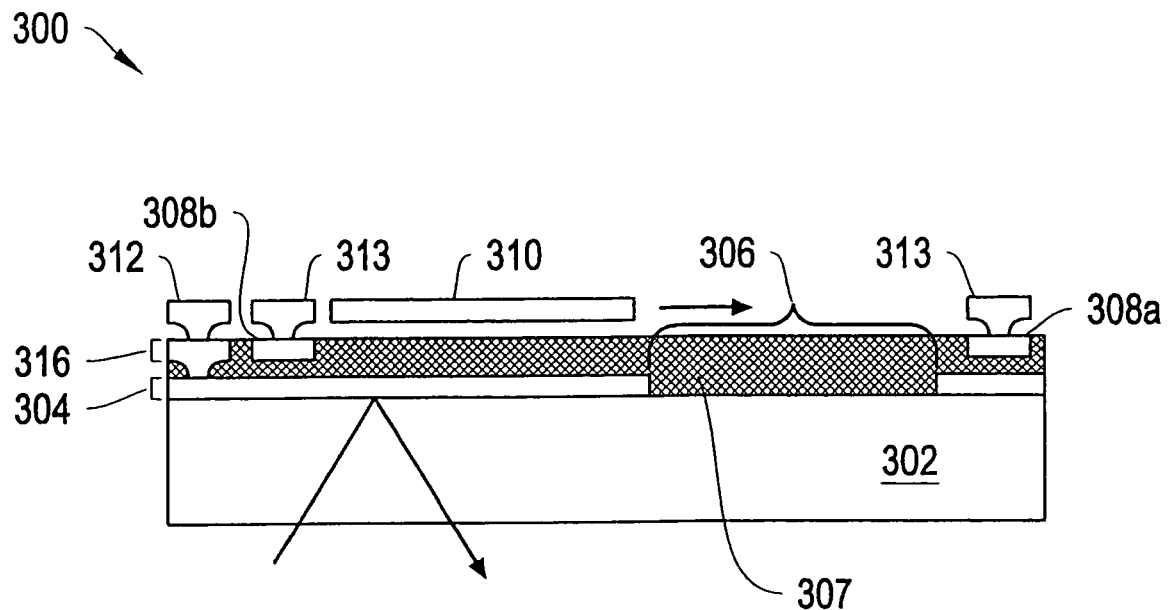
FIGS. 3A-3D are cross-sectional views of alternative shutter assembly designs, according to illustrative embodiments of the invention.

FIG. 3A is a linear cross-sectional view of a shutter assembly 300 in an open position. The shutter assembly 300 is formed on transparent substrate 302 having a thickness of from about 0.3 mm to about 2 mm. The substrate 302 can be, for example, made of a glass or a plastic. Suitable glasses include borosilicate glasses, or other glasses that can withstand processing temperatures up to or exceeding 400 degrees Centigrade. Suitable plastics for the substrate 302 include, for example, polyethyleneterephthalate (PET), or polytetrafluoroethylene (PETF), or other substantially transparent plastics that can withstand processing temperatures in excess of 200° C. Other candidate substrate materials include quartz and sapphire, which are understood to withstand processing temperatures in excess of 800° C.

The lowest layer, referred to as the "column metal layer" 304, of the shutter assembly 300 serves as the front reflective surface 202 of the optical cavity of FIG. 2. During the process of manufacturing the shutter assembly 300, an aperture 306 is etched through the column metal layer 304 to form a light-transmissive region, such as the light transmissive regions 206 of FIG. 2. The aperture 306 can be generally circular, elliptical, polygonal, serpentine, or irregular in shape. The aperture occupies about 5% to about 25% of the area dedicated to the particular shutter assembly 300 in the light modulation array. Other than at the aperture 306, the column metal layer 304 is substantially unbroken. The aperture 306 is filled with a dielectric material 307. Example dielectrics suitable for inclusion in the shutter assembly 300 include $SiO_2$, $Si_3N_4$, and $Al_2O_3$.

The next layer is composed mostly of a dielectric material 307, separating the column metal layer 304 from the row electrodes 308a and 308b disposed a layer above. The dielectric layers 316 may be between 0.3 and 10 microns thick. The top layer of the shutter assembly 300 includes a shutter anchor 312, two row anchors 313, two actuators, and a shutter 310. The beams of the actuators are not shown as the cross section of the shutter assembly 300 is taken at a position in which the row actuator beams meet the row anchors 313 and the shutter actuator beams meet the shutter 310 (see, for example, line B-B' on FIG. 1D). The top layer is supported above the lower layers by the anchors 312 so that the shutter 310 is free to move.

In alternative implementations, the row electrodes 308a and 308b are located at a lower layer in the shutter assembly 300 than the column metal layer 304. In another implementation the shutter 310 and actuators can be located at a layer below either of the column metal layer 304 or the row electrodes 308a and 308b.

As described in relation to FIG. 1B, the actuators included in the shutter assembly may be designed to be mechanically bi-stable. Alternatively, the actuators can be designed to have only one stable position. That is, absent the application of some form of actuation force, such actuators return to a pre-determined position, either open or closed. In such implementations, the shutter assembly 300 includes a single row electrode 308, which, when energized, causes the actuator to push or pull the shutter 310 out of its stable position.

Figure 3B:
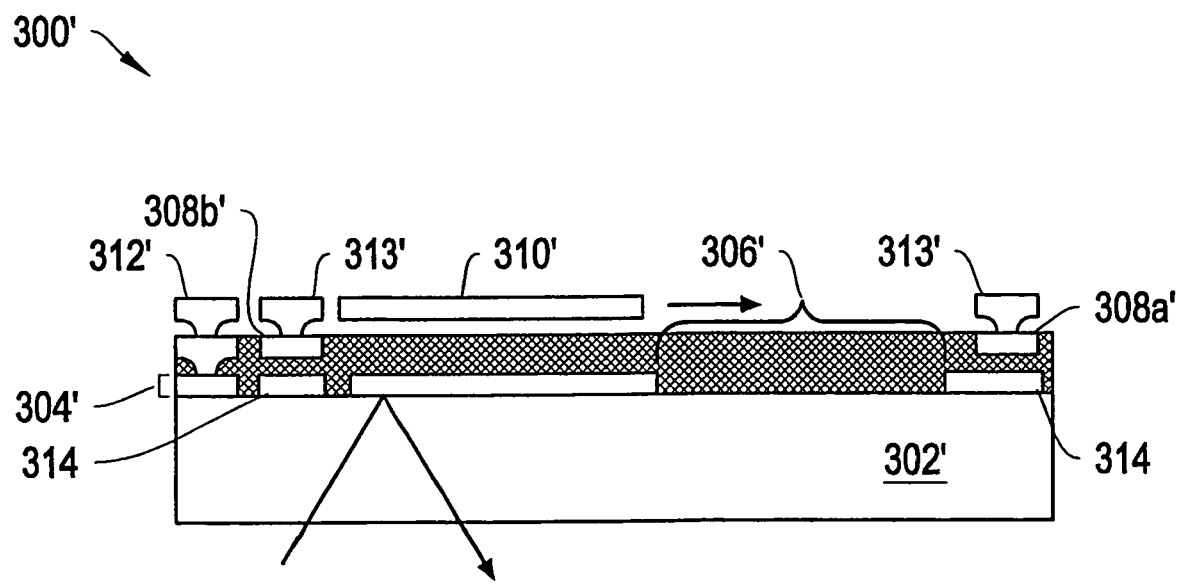

FIG. 3B is a cross-sectional view of a second alternative shutter assembly 300' in an open position according to an illustrative embodiment of the invention. The second shutter assembly 300' includes a substrate 302', a column metal layer 304', an aperture 306', row electrodes 308a' and 308b', a shutter 310', two actuators, a shutter anchor 312', and two row anchors 313'. The beams of the actuators are not shown as the cross section of the shutter assembly 300' is taken at a position in which the row actuator beams meet the row anchors 313 ' and the shutter actuator beams meet the shutter 310'. (See, for example, line B-B' on FIG. 1D).

In the shutter assembly 300', additional gaps are etched into the column metal layer 304'. The gaps electrically separate different portions of the column metal layer 304' such that different voltages can be applied to each portion. For instance, in order to reduce parasitic capacitances that can arise between the column metal layer 304' and the row electrodes 308a' and 308b' resulting from their overlap, a voltage can be selectively applied to the sections 314 of the column metal layer 304' that immediately underlies the row electrodes 308a' and 308b' and the anchor 312'.

Figure 3C:
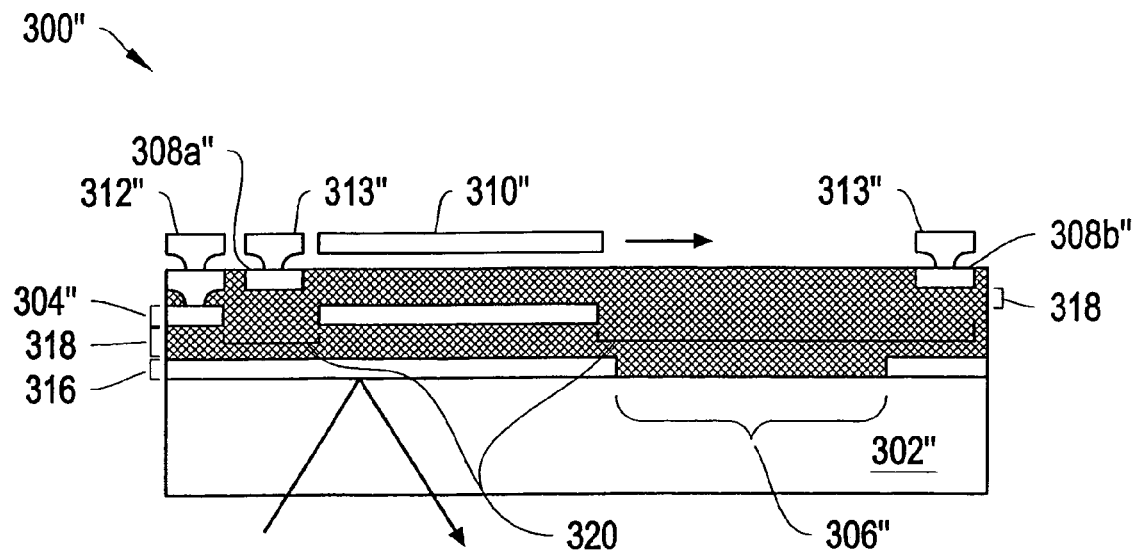

FIG. 3C is a cross-sectional view of another third alternative shutter assembly 300" according to an illustrative embodiment of the invention. The shutter assembly 300" includes a substrate 302", a column metal layer 304", an aperture 306", row electrodes 308a" and 308b", a shutter 310", two actuators, a shutter anchor 312", and two row anchors 313". The beams of the actuators are not shown as the cross section of the shutter assembly 300" is taken at a position in which the row actuator beams meet the row anchors 313" and the shutter actuator beams meet the shutter 310". (See, for example, line B-B' on FIG. 1D). The shutter assembly 300" includes a reflective film 316 deposited on the substrate 302". The reflective film 316 serves as a front reflective surface for an optical cavity incorporating the shutter assembly 300". With the exception of an aperture 306" formed in the reflective film 316 to provide a light transmissive region, the reflective film 316 is substantially unbroken. A dielectric layer 318 separates the reflective film 316 from the column metal layer 304". At least one additional dielectric layer 318 separates the column metal layer 304" from the two row electrodes 308a" and 308b". During the process of the manufacturing of the third alternative shutter assembly 300", the column metal layer 304" is etched to remove metal located below the row electrodes 308a" and 308b" to reduce potential capacitances that can form between the row electrodes 308a" and 308b" and the column metal layer 304". Gaps 320 formed in the column metal layer 304" are filled in with a dielectric.

Figure 3D:
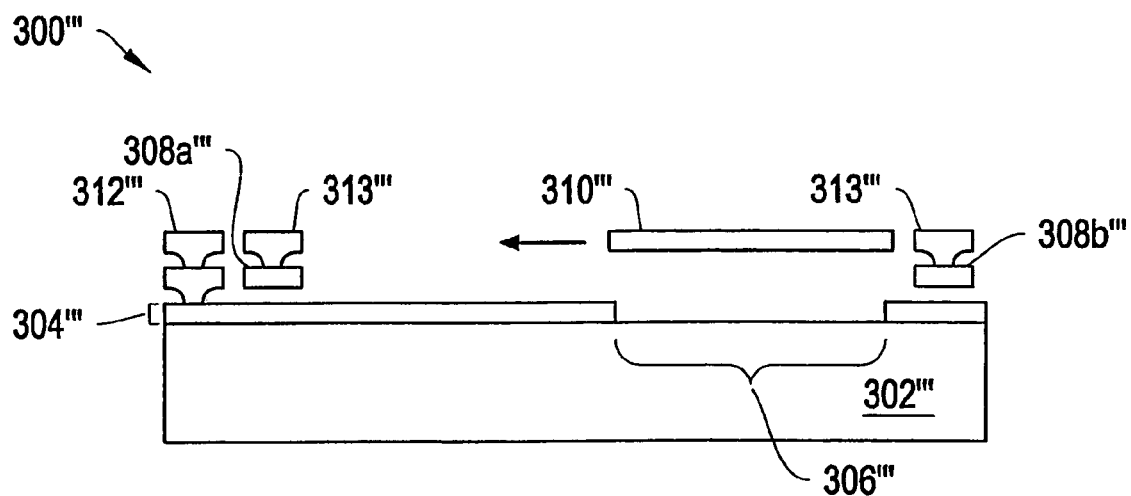

FIG. 3D is a cross-sectional view of a further alternative shutter assembly 300''' in a closed position according to an illustrative embodiment of the invention. The fourth alternative shutter assembly 300''' includes a substrate 302''', a column metal layer 304''', an aperture 306''', row electrodes 308a''' and 308b''', a shutter 310''', two actuators, a shutter anchors 312''', and two row anchors 313'''. The beams of the actuators are not shown as the cross section of the shutter assembly 300''' is taken at a position in which the row actuator beams meet the row anchors 313''' and the shutter actuator beams meet the shutter 310'''. (See, for example, line B-B' on FIG. 1D). In contrast to the previously depicted shutter assemblies 102, 300, 300', and 300", much of the dielectric material used in building the fourth alternative shutter assembly 300''' is removed by one or more etching steps.

The space previously occupied by the dielectric material can be filled with a lubricant to reduce friction and prevent stiction between the moving parts of the shutter assembly 300'''. The lubricant fluid is engineered with viscosities preferably below about centipoise and with relative dielectric constant preferably above about 2.0, and dielectric breakdown strengths above about $10^4$ V/cm. Such mechanical and electrical properties are effective at reducing the voltage necessary for moving the shutter between open and closed positions. . In one implementation, the lubricant preferably has a low refractive index, preferably less than about 1.5. In another implementation the lubricant has a refractive index that matches that of the substrate 302. Suitable lubricants include, without limitation, de-ionized water, methanol, ethanol, silicone oils, fluorinated silicone oils, dimethylsiloxane, polydimethylsiloxane, hexamethyldisiloxane, and diethylbenzene.

Figure 4:
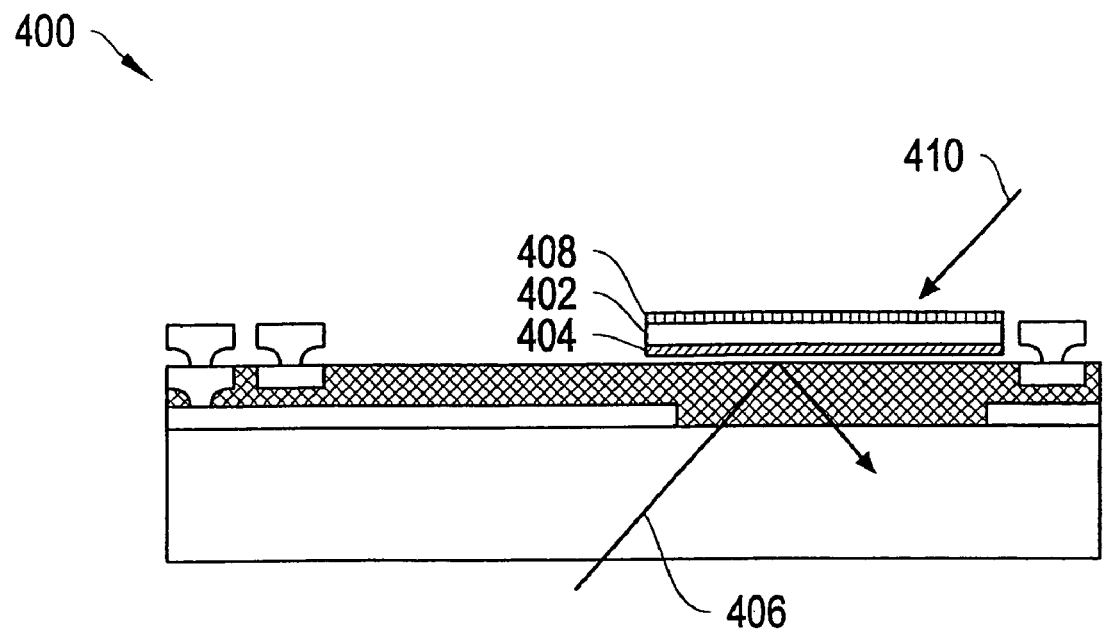
FIG. 4 is a cross-sectional view of a shutter assembly having a first coated shutter, according to an illustrative embodiment of the invention.

FIG. 4 is a cross sectional view of a shutter assembly 400 with a coated shutter 402, according to an illustrative embodiment of the invention. The shutter assembly 400 is depicted as having the general structure of the shutter assembly 300 of FIG. 3A. However, the shutter assembly 400 can take the form of any of the shutter assemblies 102, 300, 300', 300", or 300''' described above or any other shutter assembly described below.

A reflective film 404 coats the bottom of the shutter 402 to reflect light 406 back through the shutter assembly 400 when the shutter 402 is in the closed position. Suitable reflective films 404 include, without limitation, smooth depositions of Al, Cr, or Ni. The deposition of such a film 404, if the film 404 is greater than about 0.2 microns thick, provides a reflectivity for the shutter of 95% or higher. Alternatively, amorphous or polycrystalline Si, when deposited onto a smooth dielectric surface, can provide reflectivity high enough to be useful in this application The top of the shutter 402 is coated with a light absorbing film 408 to reduce reflection of ambient light 410 striking the top of the shutter assembly 400. The light absorbing film 408 can be formed from the deposition and/or anodization of a number of metals, such as Cr, Ni, or Au or Si in a manner that creates a rough or porous surface. Alternatively, the light absorbing film 408 can include an acrylic or vinyl resin which includes light absorbing pigments. In alternative implementations of the shutter assembly 400, the absorbing film 408 is applied to the entire, or substantially the entire top surface of the shutter assembly 400.

Figure 5:
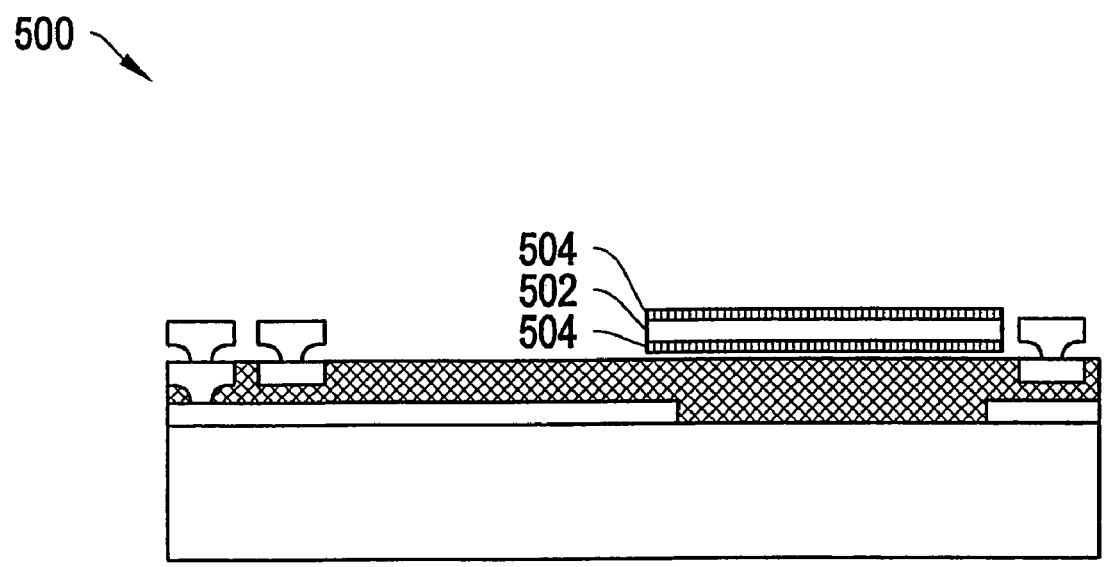
FIG. 5 is a cross-sectional view of a shutter assembly having a second coated shutter, according to an illustrative embodiment of the invention.

FIG. 5 is a cross sectional view of a shutter assembly 500 with a second coated shutter 502, according to an illustrative embodiment of the invention. The shutter assembly 500 is depicted as having the general structure of the first alternative shutter assembly 300 of FIG. 3A. However, the shutter assembly can take the form of any of the shutter assemblies describes above 102, 300, 300', 300", and 300''' or any other shutter assembly described below. In the shutter assembly 500, both the top and the bottom of the shutter 502 are coated with a light absorbing film 504 such as a light absorbing film 408. The light absorbing film 504 on the bottom of the shutter 502 absorbs light impacting the shutter 502 in a closed position. For an optical cavity, such as optical cavity 200 of FIG. 2, including the shutter assembly 500, the intensity of light exiting the optical cavity is independent of the image being formed. That is, light intensity is independent of the fraction of shutters that may be in the open or the closed position.

Figure 6:
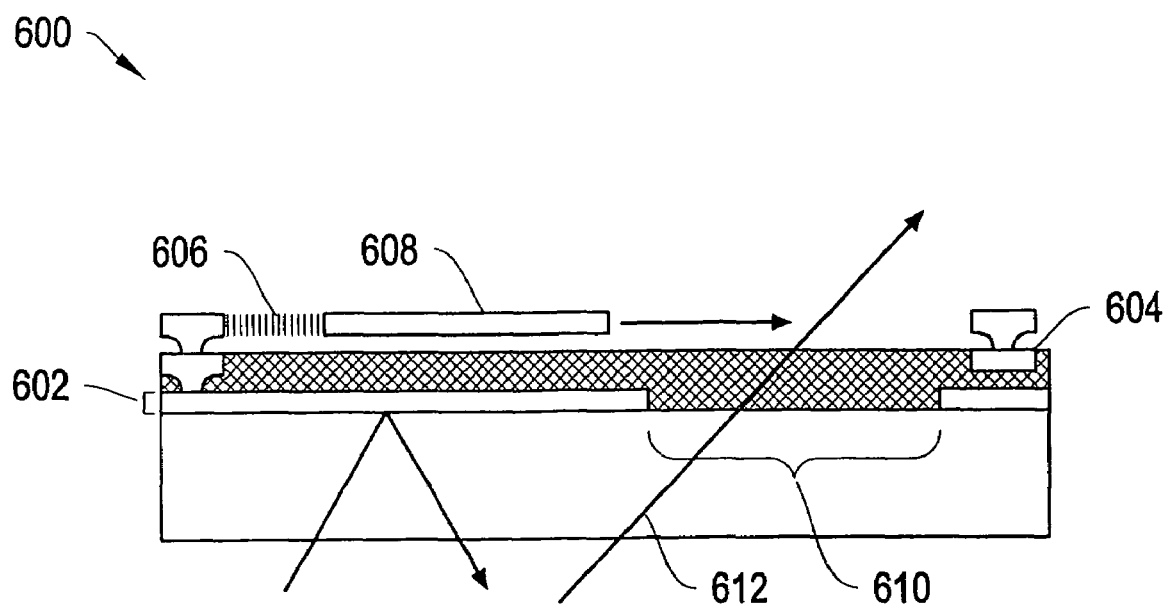
FIG. 6 is a cross-sectional view of a shutter assembly having an elastic actuator for use in the light modulation array, according to an illustrative embodiment of the invention.

FIG. 6 is cross-sectional view of an elastically actuated shutter assembly 600 for use in a light modulation array, such as light modulation array 102, according to an illustrative embodiment of the invention. The elastically actuated shutter assembly 600 includes a metal column layer 602, a single row electrode 604, an elastic element 606, and a shutter 608. The elastic element 606 provides a restoring force which keeps the shutter 608 in an open position, away from a corresponding aperture 610 in the column metal layer 602. In the open position, light 612 can pass through the aperture 610. Provision of a switching voltage to the single row electrode 604 counters the force of the elastic element 606, thereby putting the shutter 608 into a closed position over the aperture 610. In the closed position, the shutter 608 blocks light 612 from exiting through the aperture 610. In an alternative implementation, the shutter assembly 600 may include a latch to lock the shutter 608 into a closed position such that after the shutter 608 closes, the row electrode 604 can be de-energized without the shutter 608 opening. To open the shutter 608, the latch is released. In still another implementation of the shutter assembly 600, the elastic actuator tends to keep the shutter 608 in a closed position. Applying a voltage to the row electrode 604 moves the shutter 608 into an open position. Suitable spring-like elastic actuators for displays have been described in U.S. Pat. No. 5,062,689, the entirety of which is incorporated herein by reference.

Figure 7:
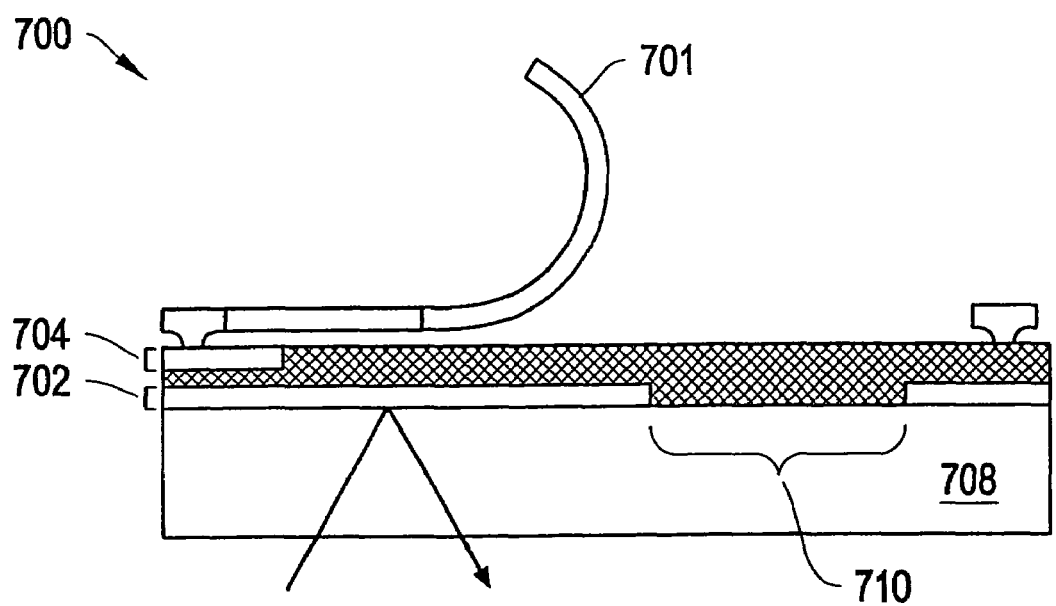
FIG. 7 is a cross-sectional view of a shutter assembly having a deforming shutter for use in the light modulation array, according to an illustrative embodiment of the invention.

FIG. 7 is a cross-sectional view of a shutter assembly 700 with a deformable shutter 701 for use in a light modulation array, according to an illustrative embodiment of the invention. The shutter assembly 700 includes a column metal layer 702, and one row electrode 704 formed on a substrate 708. The deforming shutter 701, instead of translating from one side of the shutter assembly 700 to the other side of the shutter assembly 700 to open and close, deforms in response to the energizing of the row electrode 704. The deforming shutter 701 is formed such that the deforming shutter 701 retains residual stress, resulting in the deforming shutter 701 tending to curl up out of the plane of the light modulation array in which it is included. By imposing a switching voltage between the row electrode 704 and the column metal layer 702, the deforming shutter 701 is attracted towards the substrate 708, thereby covering an aperture 710 formed in the column metal layer 702. Deformable or hinge type actuators have been described in the art, for instance in U.S. Pat. Nos. 4,564,836 and 6,731,492, the entireties of which are incorporated herein by reference.

Figure 8A:
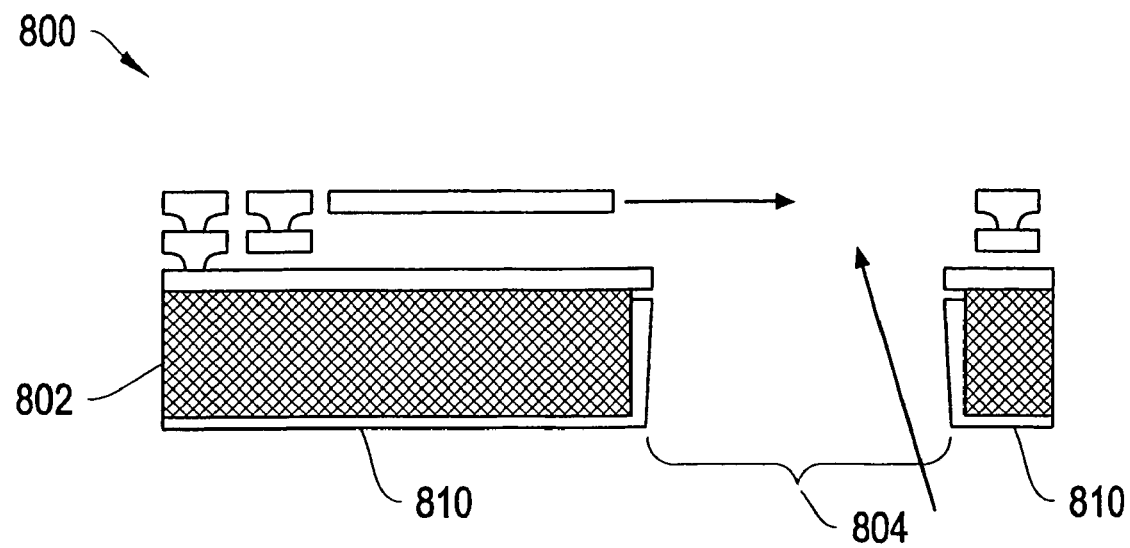
FIGS. 8A-8B are cross-sectional views of the shutter assemblies built on opaque substrates for use in the light modulation array, according to an illustrative embodiment of the invention.

FIG. 8A is a cross-sectional view of a shutter assembly 800 with an opaque substrate 802, such as silicon, for use in a light modulation array, according to an illustrative embodiment of the invention. The opaque substrate 802 has a thickness in the range of about 200 microns to about 1 mm. Though the shutter assembly 800 resembles the shutter assembly 300 of FIG. 3A, the shutter assembly 800 can take substantially the same form of any of the shutter assemblies 300, 300', 300", 300''', 400, 500, 600, or 700 described in FIGS. 3-7. An aperture 804 is etched through the entirety of the opaque substrate 802. In one implementation, the aperture 804 is formed using an anisotropic dry etch such as in a $CFCl_3$ gas with plasma or ion assist. The shutter assembly 800 may also include a reflective coating 810 deposited on the side of the opaque substrate 802 opposite the column metal layer.

Figure 8B:
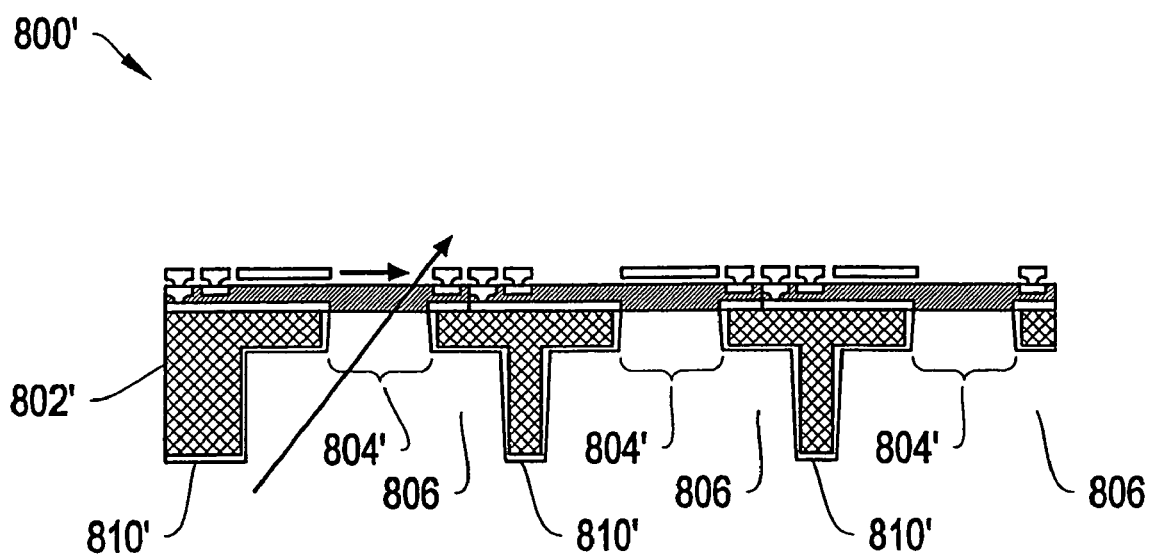

FIG. 8B is a cross-sectional view of a second shutter assembly 800' with an opaque substrate 802' for use in a light modulation array, according to an illustrative embodiment of the invention. In comparison to the shutter assembly 800 in FIG. 8A, the underside of the opaque substrate 800' is etched away forming cavities 806 beneath the apertures 804' of the shutter assembly 800'. The cavities 806 allow light from a larger range of angles to escape through the aperture 804'. The larger range provides for a brighter image and a larger viewing angle.

The shutter assemblies described in FIGS. 1 and 3-8 depend on electrostatic forces for actuation. A number of alternative actuator forcing mechanisms can be designed into shutter assemblies, including without limitation the use of electromagnetic actuators, thermoelastic actuators, piezoelectric actuators, and electrostiction actuators. Other shutter motions which can be used to controllably obstruct an aperture include without limitation sliding, rotating, bending, pivoting, hinging, or flapping; all motions which are either within the plane of the reflective surface or transverse to that plane.

Figure 9:
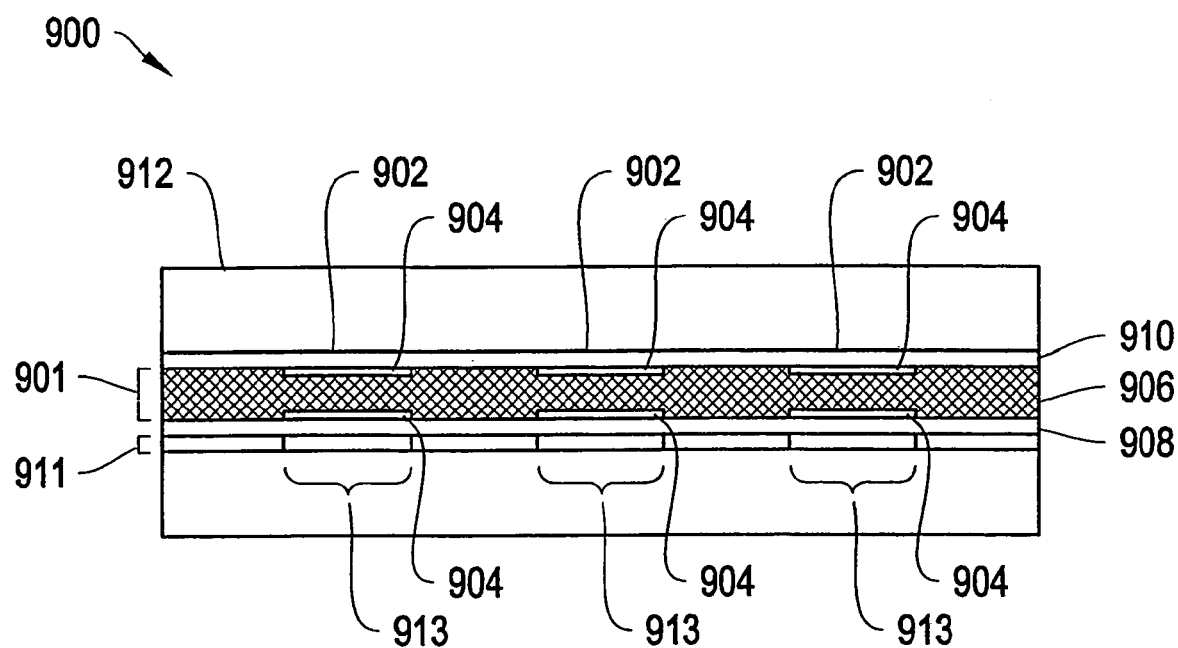
FIG. 9 is a cross-sectional view of a liquid crystal-based spatial light modulator, according to an illustrative embodiment of the invention.

FIG. 9 is a cross-sectional view of a liquid crystal-based spatial light modulator 900. The liquid crystal-based spatial light modulator 900 includes an array 901 of liquid crystal cells 902. The liquid crystal cells 902 include pairs of opposing transparent electrodes 904 on either side of a layer of liquid crystal molecules 906. On one side of the liquid crystal array 901, the liquid crystal-based spatial light modulator 900 includes a polarizer 908. On the opposite side of the array 901, the liquid crystal-based spatial light modulator 900 includes an analyzer 910. Thus, without intervention, light passing through the polarizer 908 would be filtered blocked by the analyzer 910. When a voltage is imposed between the transparent electrodes 904, the liquid crystal molecules 906 between the electrodes 904 align themselves with the resultant electric field reorienting the light passing through the polarizer 908 such that it can pass through the analyzer 910. The polarizer 908 is positioned on top of a front reflective surface 911, which defines a plurality of light-transmission regions 913. The array 901 is attached to an optical cavity, such as optical cavity 200 and includes a cover plate 912. Cover plates are described in further detail in relation to FIG. 11.

Each liquid crystal cell 902 may have a corresponding red, green, or blue color specific filter. Alternatively, color differentiation can be provided by multiple lamps operating in sequence as described above in relation to FIG. 2.

Most liquid crystal displays (LCDs) are designed with resolutions of 80 to 110 dots per inch, wherein pixel widths are in the range of 250 to 330 microns. For such an LCD display, even with active matrix or thin-film transistor (TFT) addressing or switching, the transmissiveness ratio of the liquid-crystal display is in the range of 75 to 90%. For high-resolution applications (e.g. for document displays or projection displays) in which the desired image resolution is 300 to 500 dots per inch, however, and where pixels are only 50 microns in diameter, the overhead required for TFT addressing can limit the available transmissiveness ratio to about 30 or 50%. Such high-resolution displays, therefore, typically suffer from a lower luminous efficiency than their lower-resolution counterparts due to a loss of aperture ratio. By constructing the liquid crystal display using an optical cavity as described above, greater luminous efficiency can be achieved even in high-definition LCD displays.

Figure 10:
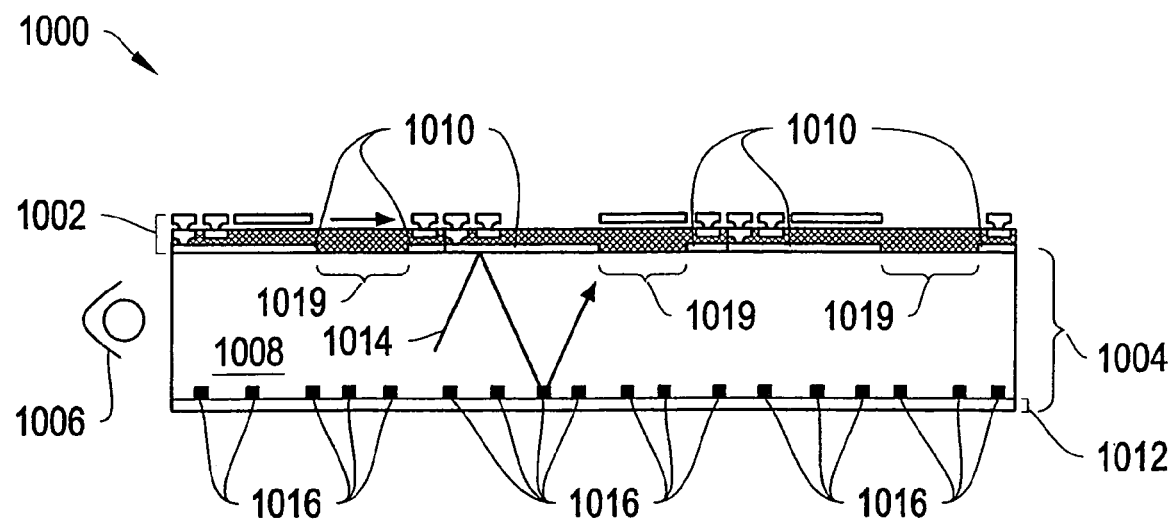
FIG. 10 is a cross-sectional view of a first shutter-based spatial light modulator, according to an illustrative embodiment of the invention.

FIG. 10 is a cross sectional view of a first shutter-based spatial light modulator 1000 according to an illustrative embodiment of the invention. The shutter-based spatial light modulator 1000 includes a light modulation array 1002, an optical cavity 1004, and a light source 1006. The light modulation array 1002 can include any of the shutter assemblies 300, 300', 300", 300''', 400, 500, 600, 700, 800, or 800' described above in FIGS. 3-8. The optical cavity 1004, in the first shutter-based spatial light modulator 1000, is formed from a light guide 1008 having front and rear surfaces. A front reflective surface 1010 is deposited directly on the front surface of the light guide 1008 and a second reflective surface 1012 is deposited directly on the rear surface of the light guide 1008.

The light guide 1008 can be formed from glass or a transparent plastic such as polycarbonate or polyethylene. The light guide 1008 is about 300 microns to about 2 mm thick. The light guide 1008 distributes light 1014 introduced into the optical cavity 1004 substantially uniformly across the surface of the front reflective surface 1010. The light guide 1008 achieves such distribution by means of a set of total internal reflections as well as by the judicial placement of light scattering elements 1016. The light scattering elements 1016 can be formed in or on the rear side of the light guide 1018 to aid in redirecting light 1014 out of the light guide 1008 and through light-transmissive regions 1019 formed in the front reflective surface 1010.

Figure 11:
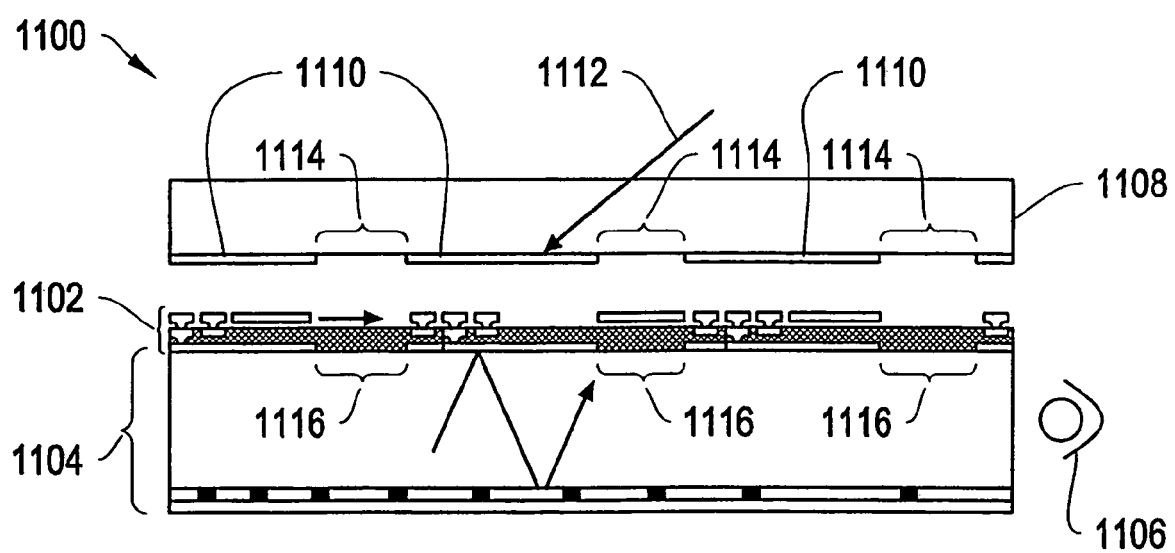
FIG. 11 is a cross-sectional view of a second shutter-based spatial light modulator, according to the illustrative embodiment of the invention.

FIG. 11 is a cross sectional view of a second shutter-based spatial light modulator 1100, according to the illustrative embodiment of the invention. As with the first shutter-based spatial light modulator 1000 in FIG. 10, the second shutter-based spatial light modulator 1100 includes a light modulation array 1102, an optical cavity 1104, and a light source 1106. In addition, the second spatial light modulator includes a cover plate 1108.

The cover plate 1108 serves several functions, including protecting the light modulation array 1102 from mechanical and environmental damage. The cover plate 1108 is a thin transparent plastic, such as polycarbonate, or a glass sheet. The cover plate can be coated and patterned with a light absorbing material, also referred to as a black matrix 1110. The black matrix can be deposited onto the cover plate as a thick film acrylic or vinyl resin that contains light absorbing pigments.

The black matrix 1110 absorbs substantially all incident ambient light 1112—ambient light is light that originates from outside the spatial light modulator 1100, from the vicinity of the viewer—except in patterned light-transmissive regions 1114 positioned substantially proximate to light-transmissive regions 1116 formed in the optical cavity 1104. The black matrix 1110 thereby increases the contrast of an image formed by the spatial light modulator 1100. The black matrix 1110 can also function to absorb light escaping the optical cavity 1104 that may be emitted, in a leaky or time-continuous fashion.

In one implementation, color filters, for example, in the form of acrylic or vinyl resins are deposited on the cover plate 1108. The filters may be deposited in a fashion similar to that used to form the black matrix 1110, but instead, the filters are patterned over the open apertures light transmissive regions 1116 of the optical cavity 1104. The resins can be doped alternately with red, green, or blue pigments.

The spacing between the light modulation array 1102 and the cover plate 1108 is less than 100 microns, and may be as little as 10 microns or less. The light modulation array 1102 and the cover plate 1108 preferably do not touch, except, in some cases, at predetermined points, as this may interfere with the operation of the light modulation array 1102. The spacing can be maintained by means of lithographically defined spacers or posts, 2 to 20 microns tall, which are placed in between the individual right modulators in the light modulators array 1102, or the spacing can be maintained by a sheet metal spacer inserted around the edges of the combined device.

Figure 12A:
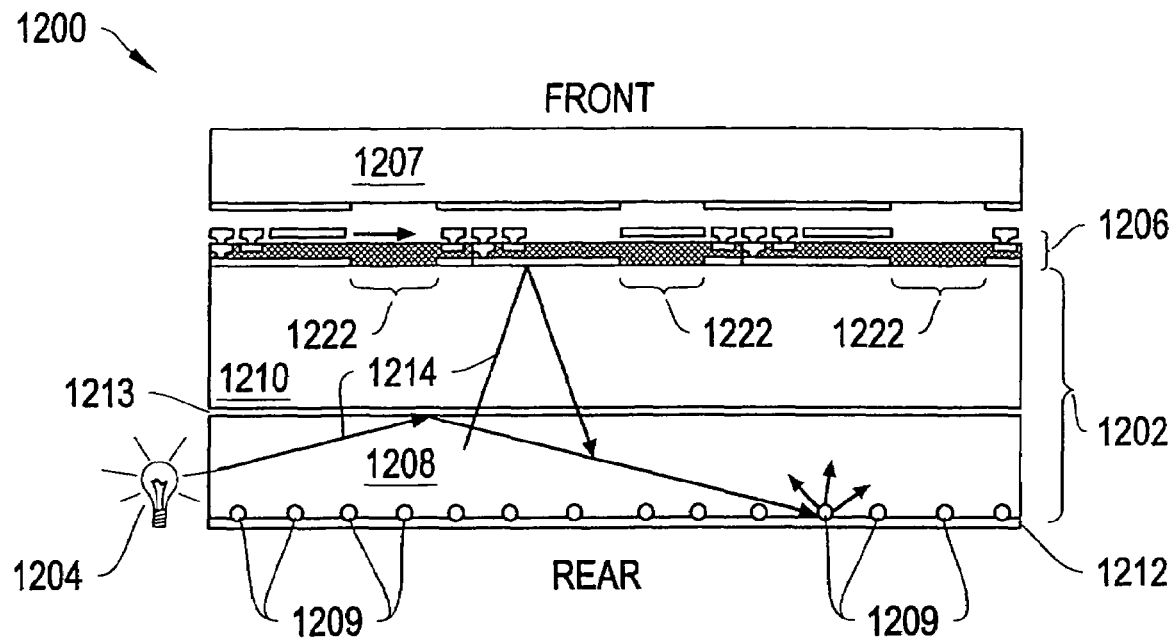
FIGS. 12A-12D are cross-sectional views of third, fourth, fifth, and sixth illustrative shutter-based spatial light modulators, according to an embodiments of the invention.

FIG. 12A is a cross sectional view of a third shutter-based spatial light modulator 1200, according to an illustrative embodiment of the invention. The third shutter-based spatial light modulator 1200 includes an optical cavity 1202, a light source 1204, and a light modulation array 1206. In addition, the third shutter-based spatial light modulator 1204 includes a cover plate 1207, such as the cover plate 1108 described in relation to FIG. 11.

The optical cavity 1202, in the third shutter-based spatial light modulator 1200, includes a light guide 1208 and the rear-facing portion of the light modulation array 1206. The light modulation array 1206 is formed on its own substrate 1210. Both the light guide 1208 and the substrate 1210 each have front and rear sides. The light modulation array 1206 is formed on the front side of the substrate 1210. A front-facing, rear-reflective surface 1212, in the form of a second metal layer, is deposited on the rear side of the light guide 1208 to form the second reflective surface of the optical cavity 1202. Alternatively, the optical cavity 1202 includes a third surface located behind and substantially facing the rear side of the light guide 1208. In such implementations, the front-facing, rear-reflective surface 1212 is deposited on the third surface facing the front of the spatial light modulator 1200, instead of directly on the rear side of the light guide 1208. The light guide 1208 includes a plurality of light scattering elements 1209, such as the light scattering elements 1016 described in relation to FIG. 10. As in FIG. 10, the light scattering elements are distributed in a predetermined pattern on the rear-facing side of the light guide 1208 to create a more uniform distribution of light throughout the optical cavity.

In one implementation, the light guide 1208 and the substrate 1210 are held in intimate contact with one another. They are preferably formed of materials having similar refractive indices so that reflections are avoided at their interface. In another implementation small standoffs or spacer materials keep the light guide 1208 and the substrate 1210 a predetermined distance apart, thereby optically de-coupling the light guide 1208 and substrate 1210 from each other. The spacing apart of the light guide 1208 and the substrate 1210 results in an air gap 1213 forming between the light guide 1208 and the substrate 1210. The air gap promotes total internal reflections within the light guide 1208 at its front-facing surface, thereby facilitating the distribution of light 1214 within the light guide before one of the light scattering elements 1209 causes the light 1214 to be directed toward the light modulator array 1206 shutter assembly. Alternatively, the gap between the light guide 1208 and the substrate 1210 can be filled by a vacuum, one or more selected gasses, or a liquid.

Figure 12B:
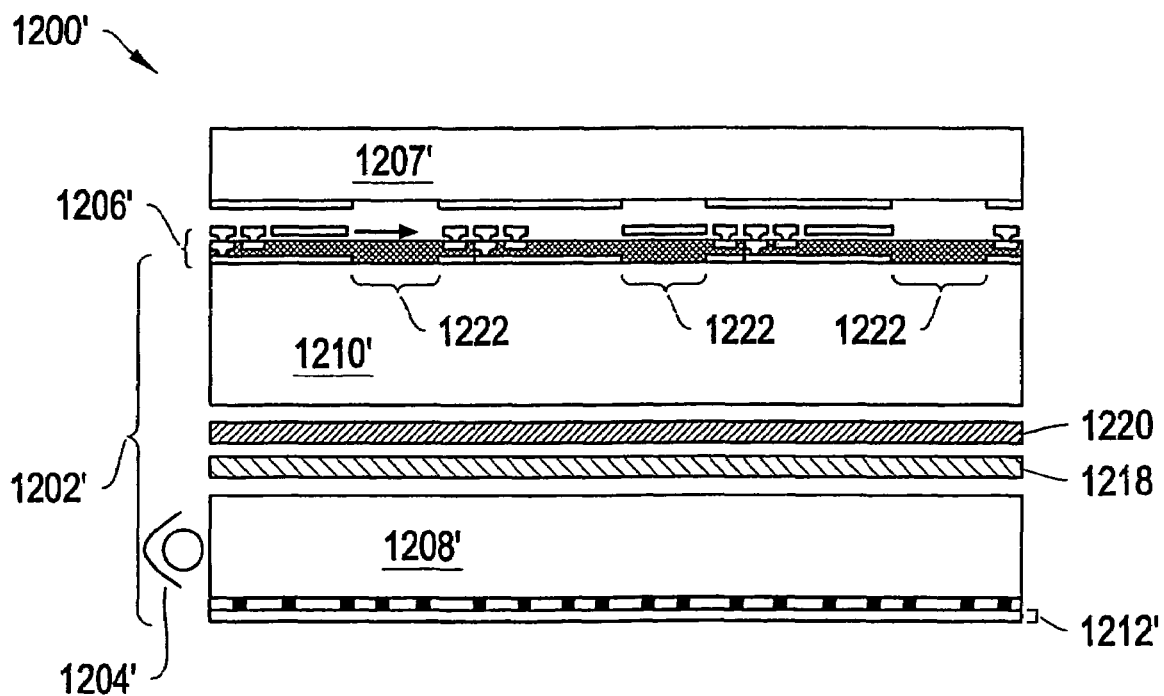

FIG. 12B is a cross sectional view of a fourth shutter-based spatial light modulator 1200', according to an illustrative embodiment of the invention. As with the spatial light modulator 1200 of FIG. 12A, the fourth spatial light modulator 1200' includes an optical cavity 1202', a light source 1204', a light modulation array 1206', and a cover plate 1207', such as the cover plate 1108 described in relation to FIG. 11. The optical cavity 1202' includes a rear-facing reflective surface in the light modulation array 1206', a light guide 1208', and a front-facing rear-reflective surface 1212'. As with the third spatial light modulator 1200, the light modulation array 1206' of the fourth spatial light modulator 1200' is formed on a substrate 1210', which is separate from the light guide 1208'.

In the fourth spatial light modulator 1200', the light guide 1208' and the substrate 1210' are separated by a light diffuser 1218 and a brightness enhancing film 1220. The diffuser 1218 helps to randomize the optical angles of scattered light 1214' to improve uniformity and reduce the formation of ghost images from the light source 1204 or the light modulation array 1206. In one implementation, the brightness enhancement film 1220 includes an array of optical prisms that are molded into a thin plastic sheet, and which act to funnel light into a narrow cone of illumination. The brightness enhancing film 1220 re-directs light leaving the light guide 1208' through light-transmissive regions 1222 at an oblique angle towards the viewer, thus resulting in an apparent increases in brightness along the optical axis for the same input power.

Figure 12C:
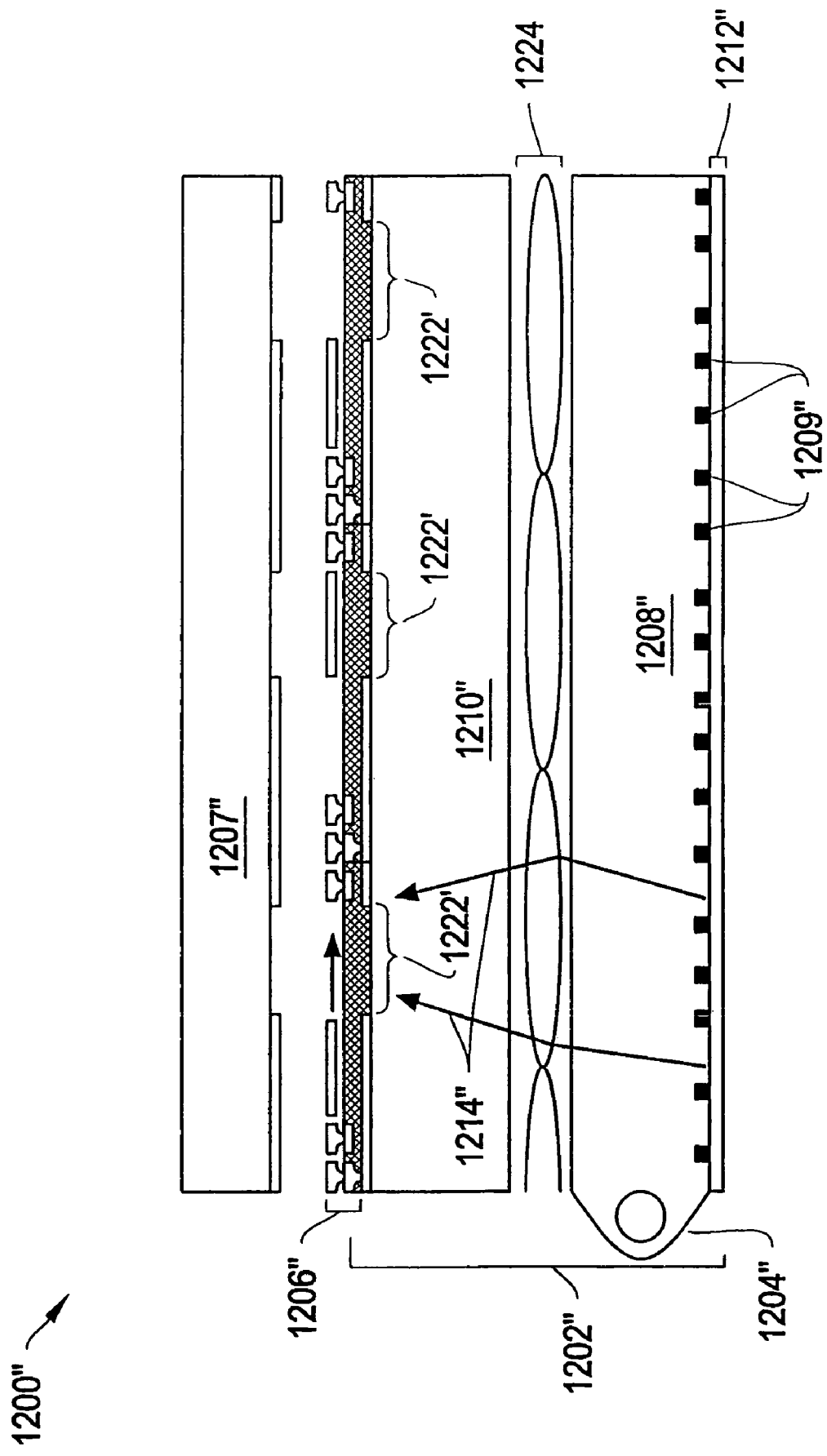

FIG. 12C is a cross sectional view of a fifth shutter-based spatial light modulator 1200", according to an illustrative embodiment of the invention. As with the spatial light modulator 1200 of FIG. 12A, the fifth spatial light modulator 1200" includes an optical cavity 1202", a light source 1204", a light modulation array 1206", and a cover plate 1207", such as the cover plate 1108 described in relation to FIG. 11. The optical cavity 1202" includes a rear-facing reflective surface in the light modulation array 1206", a light guide 1208", and a front-facing rear-reflective surface 1212". As with the third spatial light modulator 1200, the light modulation array 1206" of the fifth spatial light modulator 1200" is formed on a substrate 1210", which is separate from the light guide 1208".

In the fifth spatial light modulator 1200", the light guide 1208" and the substrate 1210" are separated by a microlens array 1224. The microlens array 1224 re-directs light 1214" leaving the light guide 1208" through light-transmissive regions 1222' at an oblique angle towards the viewer, thus resulting in an apparent increases in brightness for the same input power.

In addition, since the light modulation array 1206" in the fifth shutter-based spatial light modulator 1200" is formed on its own substrate 1210", separate from the light guide 1208", the light guide 1208" can be constructed of a moldable plastic, without the transition temperature of the plastic limiting the manufacturing processes available for constructing the light modulation array 1210". Thus, the light guide 1208" can be molded to substantially encapsulate the light source 1204" used to introduce light 1214" into the optical cavity 1202". The encapsulation of the light source 1204" into the light guide 1208" provides improved coupling of light 1214" into the light guide 1208". Similarly, scattering elements 1209" can be incorporated directly in the mold for the light guide 1208".

Figure 12D:
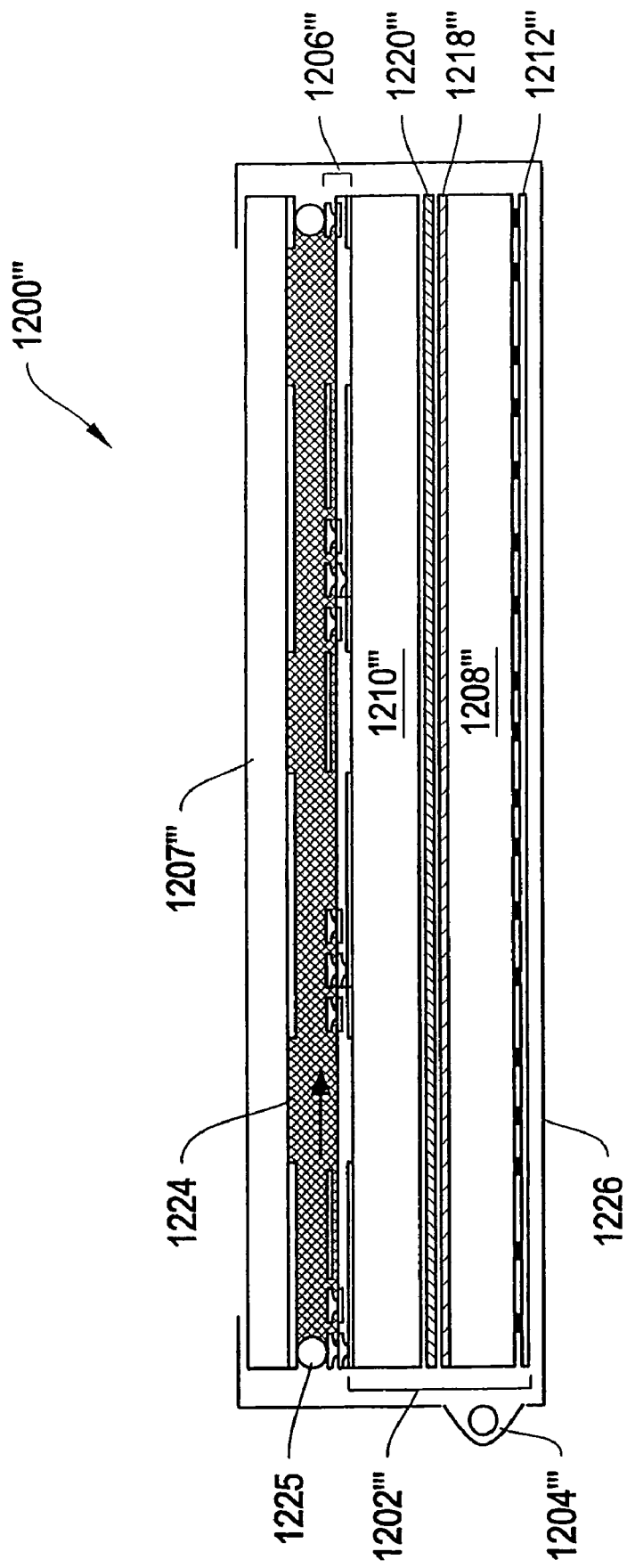

FIG. 12D is a cross-sectional view of a sixth illustrative embodiment of a shutter-based light modulation array 1200'''. As with the spatial light modulator 1200 of FIG. 12A, the sixth spatial light modulator 1200''' includes an optical cavity 1202''', a light source 1204''', a light modulation array 1206''', and a cover plate 1207''', such as the cover plate 1108 described in relation to FIG. 11. The optical cavity 1202'''. includes a rear-facing reflective surface in the light modulation array 1206''', a light guide 1208'''a front-facing rear-reflective surface 1212''', a diffuser 1218''', and a brightness enhancing film 1220'''.

The space between the light modulation array 1206''' and the cover plate 1207''' is filled with a lubricant 1224, such as the lubricant described in relation to FIG. 3D. The cover plate 1207''' is attached to the shutter assembly 1206 with an epoxy 1225. The epoxy should have a curing temperature preferably below about 200° C., it should have a coefficient of thermal expansion preferably below about 50 ppm per degree C. and should be moisture resistant. An exemplary epoxy is EPO-TEK B9021-1, sold by Epoxy Technology, Inc. The epoxy also serves to seal in the lubricant 1224.

A sheet metal or molded plastic assembly bracket 1226 holds the cover plate 1207''', the light modulation array 1206''', and the optical cavity 1202''' together around the edges. The assembly bracket 1226 is fastened with screws or indent tabs to add rigidity to the combined device. In some implementations, the light source 1204''' is molded in place by an epoxy potting compound.

Figure 13:
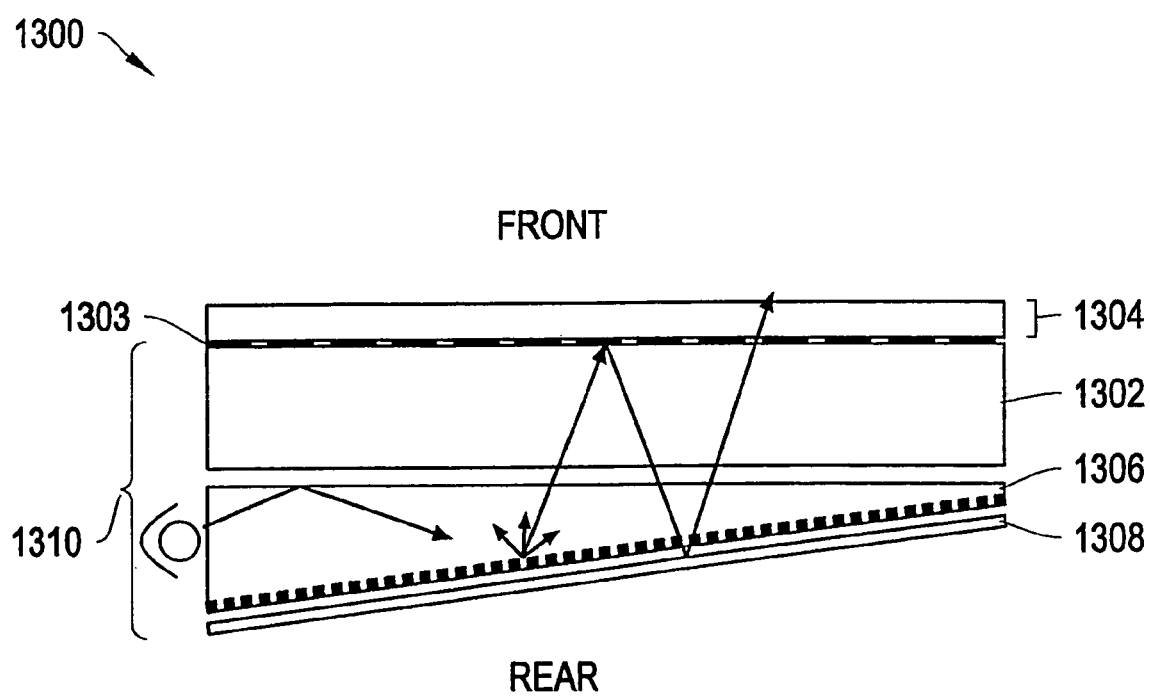
FIG. 13 is a cross-sectional view of a seventh shutter-based spatial light modulator, according to an illustrative embodiment of the invention.

FIG. 13 is a cross-sectional view of a seventh shutter-based spatial light modulator 1300 according to an illustrative embodiment of the invention. The seventh shutter-based spatial light modulator 1300 includes a substrate 1302 on which a light modulation array 1304 is formed, and a light guide 1306. The light modulation array 1304 includes a front reflective surface for the optical cavity 1310 of the spatial light modulator 1300. A reflective material is deposited or adhered to the rear side of the light guide to serve as a rear reflective surface 1308. The rear side of the light guide 1306 is angled or shaped with respect to the front side of the light guide 1308 to promote uniform distribution of light in the light modulation array 1304. The rear reflective surface 1308, however, is still partially facing the front reflective surface.

Figure 14A:
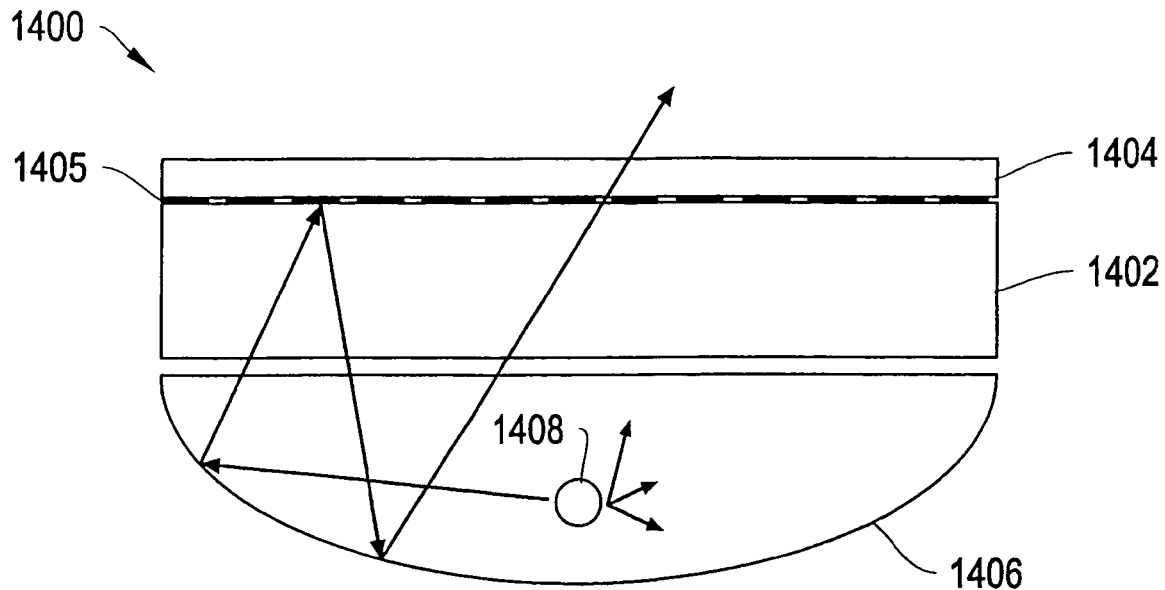
FIGS. 14A and 14B are cross-sectional views of two additional spatial light modulators, according to an illustrative embodiment of the invention.

FIG. 14A is a cross-sectional view of another spatial light modulator 1400, according to an illustrative embodiment of the invention. The spatial light modulator 1400 includes a substrate 1402 on which a light modulation array 1404 is formed. The light modulation array includes a reflective surface serving as a front reflective surface 1405 of an optical cavity. The spatial light modulation 1400 also includes a rear reflective surface 1406 substantially facing the rear side of the light modulation array 1404. A light source 1408 is positioned within the space formed between the substrate 1402 on which the light modulation array 1404 is formed and the rear reflective surface 1406. The space may also be filled with a substantially transparent plastic into which the light source 1408 is embedded.

Figure 14B:
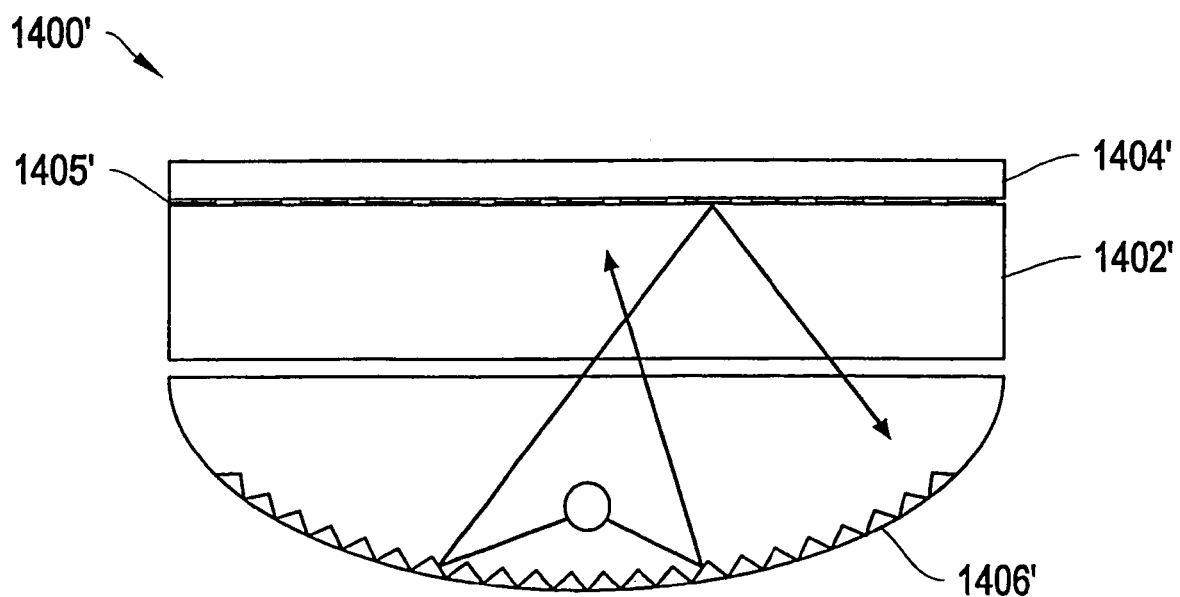

FIG. 14B is a cross-sectional view of another spatial light modulator 1400', similar to the spatial light modulator 1400 of FIG. 14A. The spatial light modulator 1400' includes a substrate 1402' on which a light modulation array 1404' is formed. The light modulation array 1404' includes a reflective surface serving as a front reflective surface 1405 of an optical cavity. The spatial light modulation 1400' also includes a rear reflective surface 1406'. The rear reflective surface 1406' is corrugated, textured, or shaped to promote light distribution in the optical cavity formed by the reflective surfaces (i.e., the rear reflective surface 1406' and a reflective surface incorporated into the light modulation array 1404' of the spatial light modulator 1400'.

Figure 15:
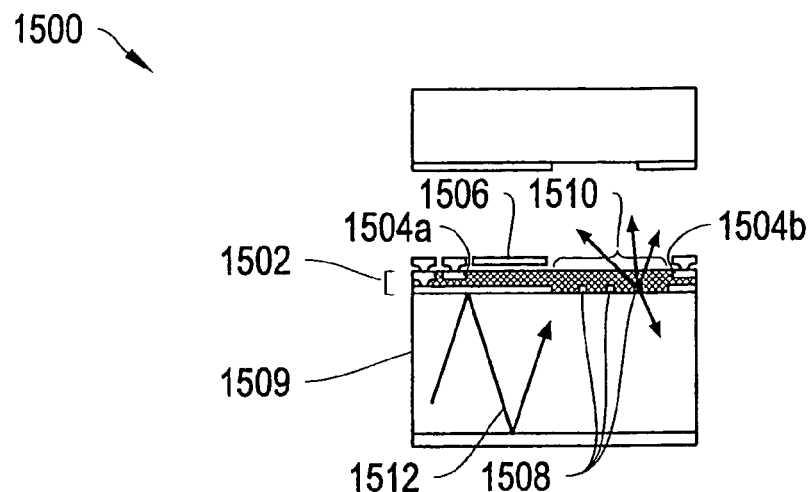
FIG. 15 is a cross-sectional view of an additional shutter assembly, according to an illustrative embodiment of the invention.

FIG. 15 is a cross-sectional view of another shutter assembly 1500 for use in a light modulation array, according to an illustrative embodiment of the invention. The shutter assembly 1500 includes a metal column layer 1502, two row electrodes 1504a and 1504b, a shutter 1506, built on a substrate 1509. The shutter assembly 1500 also includes one or more light scattering elements 1508. As with other implementations of the shutter assemblies described above, an aperture 1510 is etched through the column metal layer 1502. The light scattering elements 1510 can include any change in the shape or geometry of the substrate 1509, such as by roughening, coating, or treating the surface of the substrate 1509. For example, the light scattering elements can include patterned remnants of the column metal 1502 having dimensions of about 1 to about 5 microns. The light scattering elements 1508 aid in extracting light 1512 trapped in the substrate 1508 due to total internal reflection. When such trapped light 1512 strikes one of the scattering elements 1508, the angle of the light's 1512 path changes. If the angle of the light's 1512 path becomes sufficiently acute, it passes out of the substrate 1509.

If the shutter 1506 is in the open position, the scattered light 1512 can exit the aperture 1510, and proceed to a viewer as part of an image.

Figure 16:
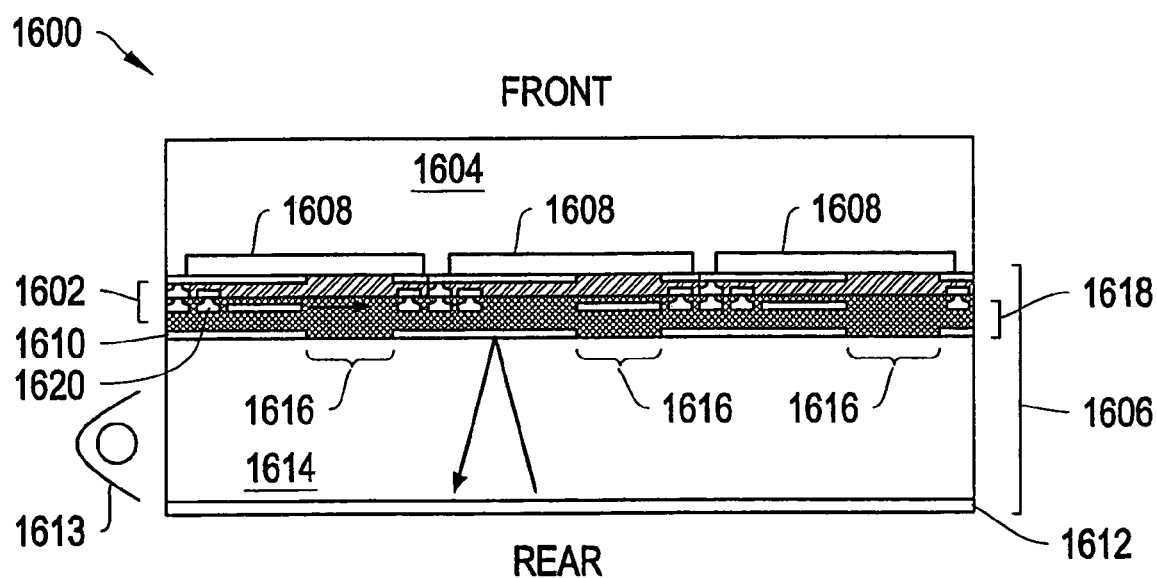
FIG. 16 is a cross-sectional view of still a further spatial light modulator, according to an illustrative embodiment of the invention.

FIG. 16 is a cross sectional view of yet another spatial light modulator 1600 according to an illustrative embodiment of the invention. The spatial light modulator 1600 includes a light modulation array 1602 formed on the rear surface of a substrate 1604, facing the interior of an optical cavity 1606. The individual light modulation elements 1608, such as the shutter assemblies 300, 300', 300", 300''', 400, 500, 600, 700, 800, and 800' described in FIGS. 3-8 or the liquid-crystal cells 902 described in FIG. 9, making up the light modulation array 1602 are modified to reverse the sides of the light modulation elements 1608 that reflect or absorb light as compared to what is described with reference to FIGS. 4 and 5.

The optical cavity 1606 includes both a front reflective surface 1610, a rear reflective surface 1612, and a light guide 1614. Light is introduced into the optical cavity by a light source 1613. The front reflective surface 1610 is disposed on front-facing surface of the light guide 1614, providing a substantially continuous layer of high reflectivity and also defining light transmissive region 1616. The front reflective surface 1610 is separated from the light modulation array 1602 by a transparent gap 1618. The gap 1618 is preferably narrower than width of the light transmissive regions 1616, less than, for example, about 100 microns. The gap 1618 may be as narrow as about 10 microns wide, or even narrower.

In one implementation, the gap 1618 is filled with a lubricant 1620, such as the lubricant described in relation to FIG. 3D. The lubricant 1620 may have a refractive index that substantially matches that of the light guide 1614 to facilitate the extraction of light from the light guide 1614.

The spatial light modulator 1600 can optionally forego a cover plate, since the shutter assembly is protected by the environment by the substrate 1604. If a cover plate is omitted, a black matrix, such as the black matrix 1110 of FIG. 11, can be applied to the front-facing surface of the substrate 1604.

Figure 17:
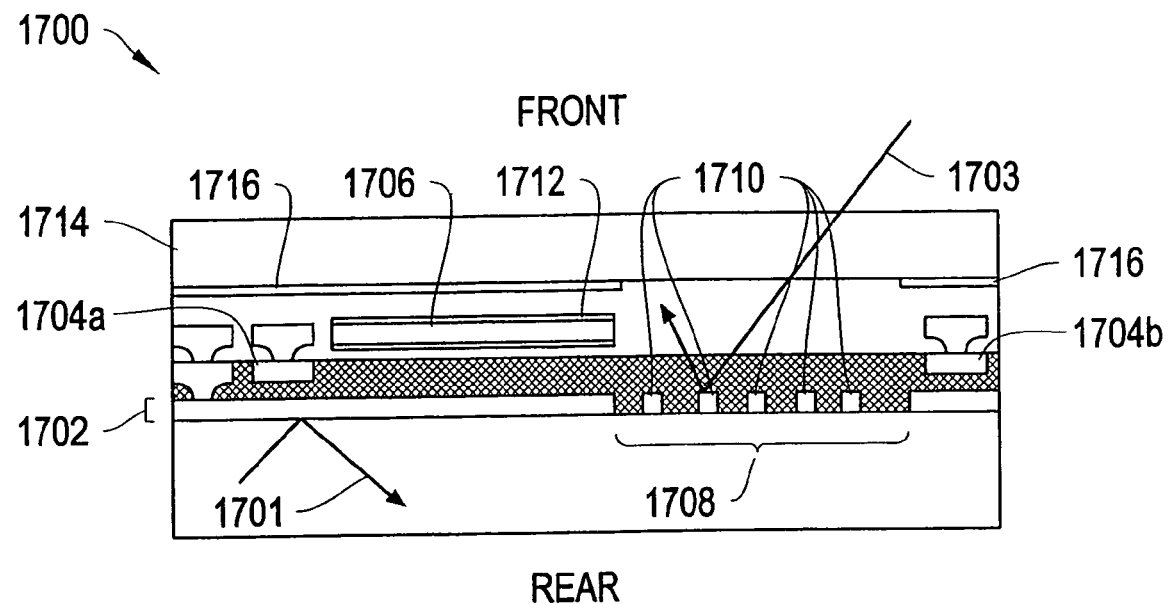
FIG. 17 is an illustrative transflective shutter assembly, according to an embodiment of the invention.

FIG. 17 is a cross-sectional view of a transflective shutter assembly 1700, according to an illustrative embodiment of the invention, which can be incorporated into the spatial light modulators 1000, 1100, 1200, 1300, 1400, and 1500 described in FIGS. 10-15. The transflective shutter assembly 1700 forms images from both light 1701 emitted by a light source positioned behind the shutter assembly 1700 and from ambient light 1703. The transflective shutter assembly 1700 includes a metal column layer 1702, two row electrodes 1704a and 1704b, and a shutter 1706. The transflective shutter assembly 1700 includes an aperture 1708 etched through the column metal layer 1702. Portions of the column metal layer 1702, having dimensions of from about 1 to about 5 microns, are left on the surface of the aperture 1708 to serve as transflection elements 1710. A light absorbing film 1712 covers the top surface of the shutter 1706.

While the shutter is in the closed position, the light absorbing film 1712 absorbs ambient light 1703 impinging on the top surface of the shutter 1706. While the shutter 1706 is in the open position as depicted in FIG. 17, the transflective shutter assembly 1700 contributes to the formation of an image both by allowing light 1701 to pass through the transflective shutter assembly originating from the dedicated light source and from reflected ambient light 1703. The small size of the transflective elements 1710 results in a somewhat random pattern of ambient light 1703 reflection.

The transflective shutter assembly 1700 is covered with a cover plate 1714, which includes a black matrix 1716. The black matrix absorbs light, thereby substantially preventing ambient light 1703 from reflecting back to a viewer unless the ambient light 1703 reflects off of an uncovered aperture 1708.

Figure 18:
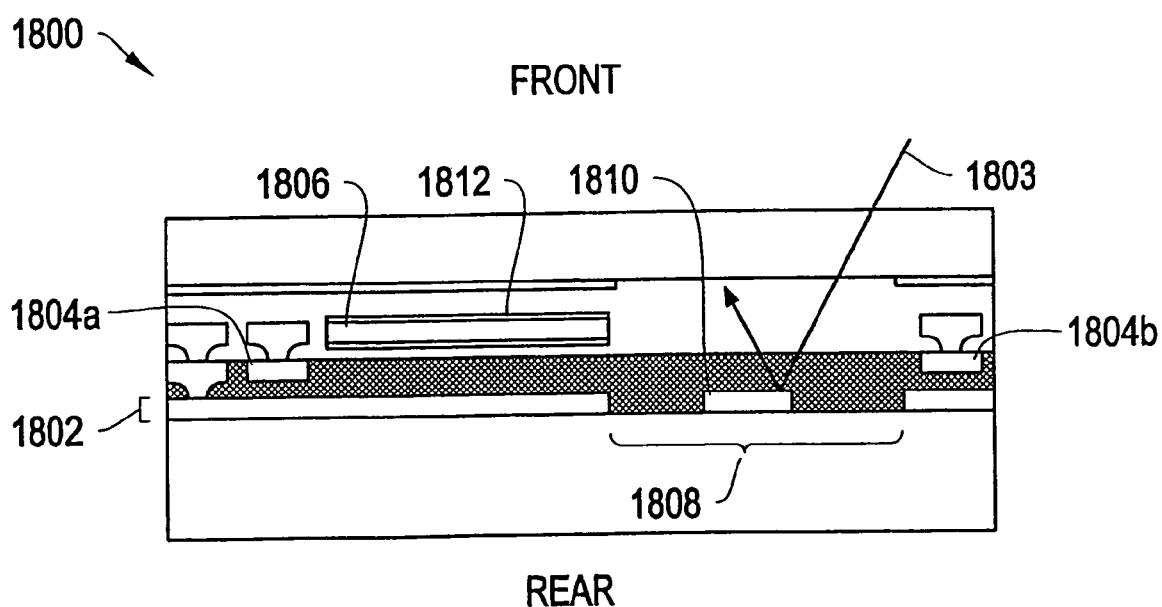
FIG. 18 is a second illustrative transflective shutter assembly, according to an embodiment of the invention.

FIG. 18 is a cross-sectional view of a second transflective shutter assembly 1800 according to an illustrative embodiment of the invention, which can be incorporated into the spatial light modulators 1000, 1100, 1200, 1300, 1400, and 1500 described in FIGS. 10-15. The transflective shutter assembly 1800 includes a metal column layer 1802, two row electrodes 1804a and 1804b, and a shutter 1806. The transflective shutter assembly 1800 includes an aperture 1808 etched through the column metal layer 1702. At least one portion of the column metal layer 1802, having dimensions of from about 5 to about 20 microns, remains on the surface of the aperture 1808 to serve as a transflection element 1810. A light absorbing film 1812 covers the top surface of the shutter 1806. While the shutter is in the closed position, the light absorbing film 1812 absorbs ambient light 1803 impinging on the top surface of the shutter 1806. While the shutter 1806 is in the open position, the transflective element 1810 reflects a portion of ambient light 1803 striking the aperture 1808 back towards a viewer. The larger dimensions of the transflective element 1810 in comparison to the transflective elements 1710 yield a a more specular mode of reflection, such that ambient light originating from behind the viewer is substantially reflected directly back to the viewer.

The transflective shutter assembly 1800 is covered with a cover plate 1814, which includes a black matrix 1816. The black matrix absorbs light, thereby substantially preventing ambient light 1803 from reflecting back to a viewer unless the ambient light 1803 reflects off of an uncovered aperture 1808.

Referring to both FIGS. 17 and 18, even with the transflective elements 1710 and 1810 positioned in the apertures 1708 and 1808, some portion of the ambient light 1703 and 1803 passes through the apertures 1708 and 1808 of the corresponding transflective shutter assemblies 1700 and 1800. When the transflective shutter assemblies 1700 and 1800 are incorporated into spatial light modulators having optical cavities and light sources, as described above, the ambient light 1703 and 1803 passing through the apertures 1708 and 1808 enters the optical cavity and is recycled along with the light introduced by the light source. In alternative transflective shutter assemblies, the apertures in the column metal are at least partially filled with a semi-reflective-semitransmissive material.

Figure 19:
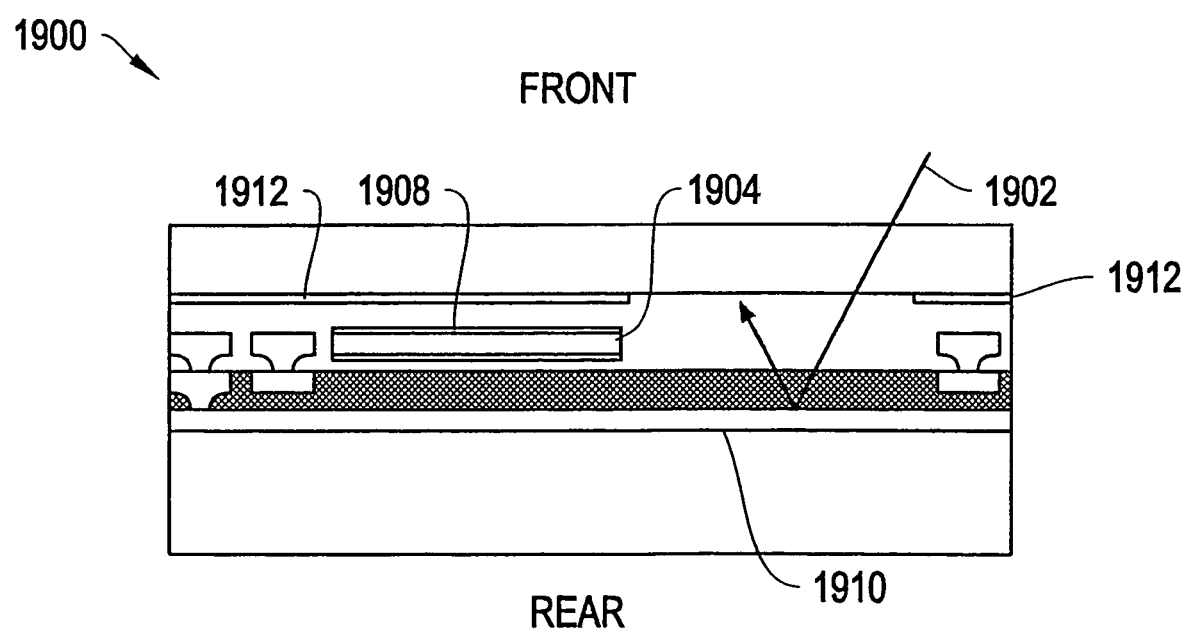
FIG. 19 is a cross-sectional view of a front reflective shutter assembly, according to an illustrative embodiment of the invention.

FIG. 19 is a cross sectional view of a front reflective shutter assembly 1900 according to an illustrative embodiment of the invention. The front reflective shutter assembly 1900 can be used in a reflective light modulation array. The front reflective shutter assembly 1900 reflects ambient light 1902 towards a viewer. Thus, use of arrays of the front reflective shutter assembly 1900 in spatial light modulators obviates the need for a dedicated light source in viewing environments having high amounts of ambient light 1902. The front reflective shutter assembly 1900 can take substantially the same form of the shutter assemblies 300, 300', 300", 300''', 400, 500, 600, 700, 800 or 800' of FIGS. 3-8. However, instead of the column metal layer of the shutter assemblies 300, 400, 500, 600, 700, or 800 including an aperture to allow passage of light, the column metal layer includes a reflective surface beneath the position of a closed shutter 1904. The front-most layer of the reflective shutter assembly 1900, including at least the front surface of the shutter 1904, is coated in a light absorbing film 1908. Thus, when the shutter 1904 is closed, light 1902 impinging on the reflective shutter assembly 1900 is absorbed. When the shutter 1904 is open, at least a fraction of the light 1902 impinging on the reflective shutter assembly 1900 reflects off the exposed column metal layer 1910 back towards a viewer. Alternately the column metal layer 1910 can be covered with an absorbing film while the front surface of shutter 1908 can be covered in a reflective film. In this fashion light is reflected back to the viewer only when the shutter is closed.

As with the other shutter assemblies and light modulators described above, the reflective shutter assembly 1900 can be covered with a cover plate 1910 having a black matrix 1912 applied thereto. The black matrix 1912 covers portions of the cover plate 1910 not opposing the open position of the shutter.

Figure 20:
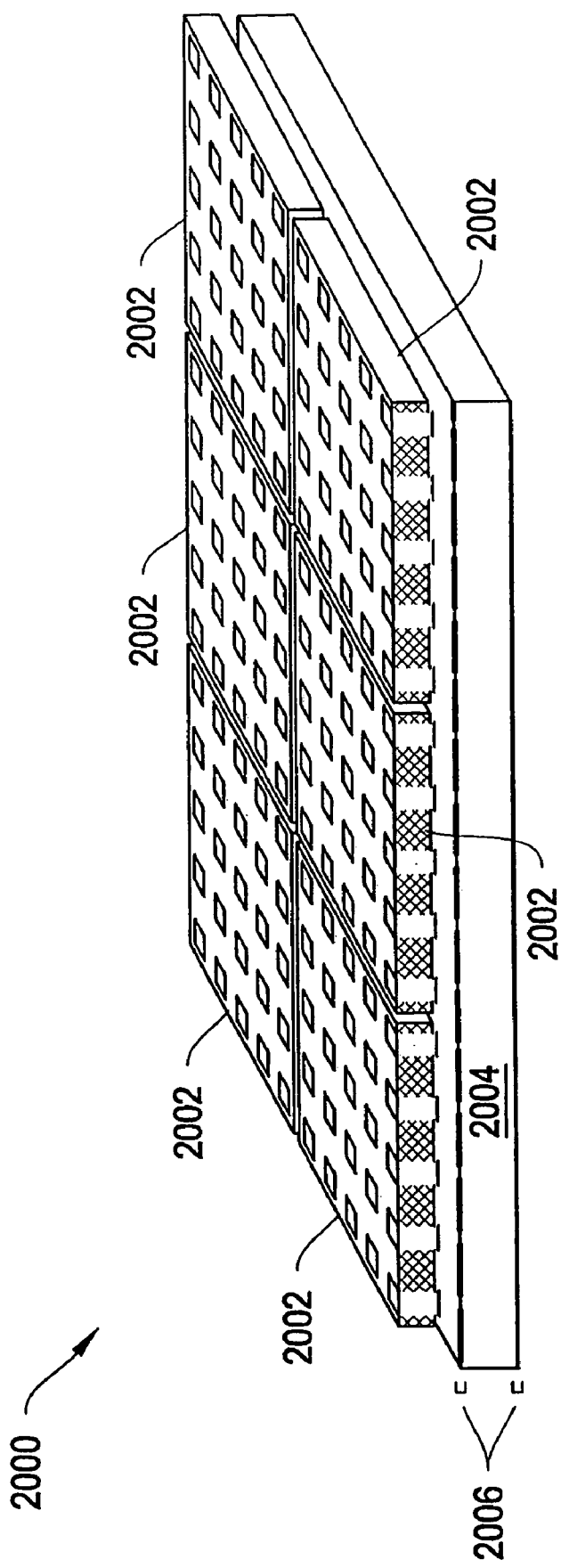
FIG. 20 is an isometric view of a larger scale display formed from an array of light modulation arrays, according to an illustrative embodiment of the invention.

FIG. 20 is an isometric view of a spatial light modulator 2000 including multiple light modulation arrays 2002, according to an illustrative embodiment of the invention. The size of several of the light modulation arrays 2002 described above is limited, somewhat, by the semiconductor manufacturing techniques used to construct them. However, light guides 2004 and reflective films 2006 can be formed on a significantly larger scale. A spatial light modulator which includes multiple, adjacently disposed light modulation arrays 2002, arranged over one or more light guides 2004, can generate a larger image, thereby circumventing these limitations.

The invention may be embodied in other specific forms without departing from the spirit or essential characteristics thereof. The forgoing embodiments are therefore to be considered in all respects illustrative, rather than limiting of the invention.

What is claimed is:

1. A display apparatus comprising:
   an array of MEMS-based light modulators;
   a liquid in which the array of MEMS-based light modulators is at least partially immersed, and
   a transparent substrate on which the array of MEMS-based light modulators are formed, wherein the liquid has a first index of refraction, the transparent substrate has a second index of refraction, and the first index of refraction substantially matches the second index of refraction.

2. The display apparatus of claim 1, wherein the liquid is sealed into a cavity formed between the transparent substrate and a transparent body.

3. The display apparatus of claim 2, wherein the transparent substrate is spaced away from and opposite to the transparent body and the liquid fills a gap existing between the MEMS-based light modulators and the transparent body.

4. The display apparatus of claim 2, wherein the transparent body comprises a cover plate.

5. The display apparatus of claim 2, wherein the transparent body comprises a light guide.

6. This display apparatus of claim 1, wherein the liquid has an index of refraction of less than about 1.5.

7. The display apparatus of claim 1, wherein the liquid has a dielectric constant of above about 2.0.

8. The display apparatus of claim 1, wherein the liquid is a lubricant.

9. The display apparatus of claim 1, wherein the liquid has a viscosity below about 10 centipoise.

10. The display apparatus of claim 1, wherein the liquid has a dielectric breakdown strength above about 10,000 V/cm.

11. The display apparatus of claim 1, wherein MEMS-based light modulators of the array have surfaces that come into contact during operation of the display apparatus, and the liquid reduces stiction between the surfaces of the MEMS-based light modulators when the surfaces are in contact.

12. The display apparatus of claim 1, wherein the liquid comprises one of de-ionized water, methanol, ethanol, silicone oils, fluorinated silicone oils, dimethylsiloxane, polydimethylsiloxane, hexamethyldisiloxane, and diethylbenzene.

13. The display apparatus of claim 1, wherein the MEMS-based light modulators in the array of MEMS-based light modulators comprise shutters.

14. The display apparatus of claim 13, comprising an aperture layer having a plurality of apertures formed therein positioned proximate the array of MEMS-based light modulators.

15. The display apparatus of claim 14, wherein the aperture layer comprises a reflective material.

16. The display apparatus of claim 14, wherein the aperture layer comprises one of a dielectric mirror and a metal.

17. The display apparatus of claim 14, wherein the shutters are positioned less than about 100 microns from the aperture layer.

18. The display apparatus of claim 14, wherein the shutters are positioned less than about 10 microns from the aperture layer.

19. A display apparatus comprising:
an array of MEMS-based light modulators; and
a liquid in which the array of MEMS-based light modulators is at least partially immersed, wherein the liquid comprises a silicone oil.

20. The display apparatus of claim 19, wherein the liquid is sealed into a cavity formed between a substrate, on which the array of MEMS-based light modulators are formed, and a transparent body.

21. The display apparatus of claim 20, wherein the substrate is spaced away from and opposite to the transparent body and the liquid fills a gap existing between the MEMS-based light modulators and the transparent body.

22. The display apparatus of claim 20, wherein the transparent body comprises a cover plate.

23. The display apparatus of claim 22, wherein the substrate is transparent.

24. The display apparatus of claim 23, wherein the liquid has a first index of refraction, the substrate has a second index of refraction, and wherein the first index of refraction substantially matches the second index of refraction.

25. The display apparatus of claim 20, wherein the liquid has a first index of refraction, the transparent body has a second index of refraction, and wherein the first index of refraction substantially matches the second index of refraction.

26. The display apparatus of claim 25, wherein the transparent body comprises a light guide.

27. This display apparatus of claim 19, wherein the liquid has an index of refraction of less than about 1.5.

28. The display apparatus of claim 19, wherein the liquid has a dielectric constant of above about 2.0.

29. The display apparatus of claim 19, wherein the liquid is a lubricant.

30. The display apparatus of claim 19, wherein the liquid has a viscosity below about 10 centipoise.

31. The display apparatus of claim 19, wherein the liquid has a dielectric breakdown strength above about 10,000 V/cm.

32. The display apparatus of claim 19, wherein MEMS-based light modulators of the array have surfaces that come into contact during operation of the display apparatus, and the liquid reduces stiction between surfaces of the MEMS-based light modulators when the surfaces are in contact.

33. The display apparatus of claim 19, wherein the MEMS-based light modulators in the array of MEMS-based light modulators comprise shutters.

34. The display apparatus of claim 33, comprising an aperture layer having a plurality of apertures formed therein positioned proximate the array of MEMS-based light modulators.

35. The display apparatus of claim 34, wherein the aperture layer comprises a reflective material.

36. The display apparatus of claim 34, wherein the aperture layer comprises one of a dielectric mirror and a metal.

37. The display apparatus of claim 34, wherein the shutters are positioned less than about 100 microns from the aperture layer.

38. The display apparatus of claim 34, wherein the shutters are positioned less than about 10 microns from the aperture layer.

39. The display apparatus of claim 19, wherein the liquid comprises a fluorinated silicone oil.

40. The display apparatus of claim 19, wherein the liquid comprises a siloxane.

* * * * *